US012522472B2

(12) United States Patent
Sever

(10) Patent No.: US 12,522,472 B2
(45) Date of Patent: Jan. 13, 2026

(54) ELEVATOR SYSTEM, KIT AND METHOD

(71) Applicant: Oded Sever, Kiryat Tivon (IL)

(72) Inventor: Oded Sever, Kiryat Tivon (IL)

( * ) Notice: Subject to any disclaimer, the term of this patent is extended or adjusted under 35 U.S.C. 154(b) by 0 days.

(21) Appl. No.: 18/857,315

(22) PCT Filed: Apr. 23, 2023

(86) PCT No.: PCT/IL2023/050412
§ 371 (c)(1),
(2) Date: Oct. 16, 2024

(87) PCT Pub. No.: WO2023/209702
PCT Pub. Date: Nov. 2, 2023

(65) Prior Publication Data

US 2025/0270071 A1 Aug. 28, 2025

(30) Foreign Application Priority Data

Apr. 24, 2022 (IL) .......................................... 292435

(51) Int. Cl.
*B66B 9/187* (2006.01)
*B66B 9/02* (2006.01)
*B66B 9/08* (2006.01)

(52) U.S. Cl.
CPC .............. *B66B 9/187* (2013.01); *B66B 9/022* (2013.01); *B66B 9/0815* (2013.01)

(58) Field of Classification Search
CPC .......... B66B 19/002; B66B 9/187; B66B 9/16
See application file for complete search history.

(56) References Cited

U.S. PATENT DOCUMENTS 2,560,499 A * 7/1951 Warry ....................... B66D 1/50
187/244
3,851,736 A * 12/1974 Westlake .............. B66B 19/002
52/30

(Continued)

FOREIGN PATENT DOCUMENTS

EP 1826170 A1 8/2007
EP 2530042 A1 12/2012

(Continued)

*Primary Examiner* — Michael A Riegelman
(74) *Attorney, Agent, or Firm* — Ballard Spahr LLP

(57) ABSTRACT

A kit provides an elevator system defining an elevator transport axis with respect to an exposed vertical face of a vertical structure. The kit includes an elevator platform, rail segment modules having elevator rail element(s), a base structure and a rail segment stacking system. The rail segment modules can be serially stacked contiguously via the rail segment stacking system to provide a mast stack, forming contiguous vertical elevator rail(s) parallel to the elevator transport axis. The elevator platform can be transported along the mast stack via the vertical elevator rail. The base structure has a module receiving station which receives from a rail segment module source each rail segment module in turn, and feeds each one to the rail segment stacking system, allowing on-site coupling and bottom-to-top stacking of the fed rail segment modules, providing a progressively elongating mast stack, and transporting the progressively elongating mast stack vertically and progressively further away from the ground after each rail segment module is stacked thereto.

20 Claims, 20 Drawing Sheets

(56) References Cited

U.S. PATENT DOCUMENTS

| | | | | | |
|---|---|---|---|---|---|
| 4,018,306 | A * | 4/1977 | Lyons | A62B 1/00 | 104/235 |
| 4,664,226 | A * | 5/1987 | Centanne | A62B 1/02 | 182/141 |
| 4,706,779 | A * | 11/1987 | Bono | B66B 9/16 | 182/2.11 |
| 5,065,843 | A * | 11/1991 | Richards | B66B 19/002 | 187/408 |
| 5,121,816 | A * | 6/1992 | Curtin | B66B 9/16 | 187/289 |
| 6,308,802 | B1 * | 10/2001 | Briere | B66B 9/16 | 187/242 |
| 8,291,568 | B2 * | 10/2012 | Barneman | B66B 19/00 | 29/431 |
| 8,720,032 | B2 * | 5/2014 | Van der Meijden | B66B 19/02 | 187/414 |
| 9,580,279 | B2 * | 2/2017 | Bolme | B66B 5/0087 | |
| 9,617,121 | B2 * | 4/2017 | Bolme | B66B 19/002 | |
| 11,358,834 | B2 * | 6/2022 | Haag | B66B 7/026 | |
| 11,414,303 | B2 * | 8/2022 | Haapaniemi | B66B 19/007 | |
| 11,851,304 | B2 * | 12/2023 | Kinjarapu | B66B 19/002 | |
| 2004/0262086 | A1 * | 12/2004 | Korchagin | B66B 9/187 | 187/239 |
| 2006/0243539 | A1 * | 11/2006 | Cruz | B66B 19/002 | 187/408 |
| 2008/0230321 | A1 * | 9/2008 | Csaszar | B66B 9/16 | 187/244 |
| 2010/0133048 | A1 * | 6/2010 | Barneman | B66B 19/00 | 187/414 |
| 2011/0120801 | A1 * | 5/2011 | Stromland | E04G 1/20 | 182/141 |
| 2013/0001012 | A1 * | 1/2013 | Solhjem | E04G 1/24 | 182/69.6 |
| 2013/0133982 | A1 * | 5/2013 | Graf | B66B 9/187 | 187/239 |
| 2015/0314993 | A1 * | 11/2015 | Bolme | B66B 19/00 | 52/741.1 |
| 2016/0362284 | A1 * | 12/2016 | Haessler | B66F 11/04 | |
| 2021/0362980 | A1 * | 11/2021 | Barker | B66B 9/187 | |
| 2025/0270071 | A1 * | 8/2025 | Sever | B66B 9/022 | |

FOREIGN PATENT DOCUMENTS

| | | | |
|---|---|---|---|
| GB | 2099789 | A | 12/1982 |
| WO | 9405587 | A1 | 3/1994 |

* cited by examiner

ELEVATOR SYSTEM, KIT AND METHOD

TECHNOLOGICAL FIELD

The presently disclosed subject matter relates to elevator systems that are positioned externally with respect to a building structure.

BACKGROUND

Access to a tall building from the outside of the building is sometimes necessary, for example for evacuation of the building in emergencies such as for example when the building is on fire. While access up to 64 meters height of buildings can be reached using conventional means such as for example fireman's ladders, external access to parts of the building higher than this is not conventionally possible without the use of an external lift or similar transportation device, already present and affixed to the outside of the building.

By way of non-limiting example, U.S. Pat. No. 4,018,306 discloses an emergency building access apparatus permitting ready access to a multi-story building on fire and rapid evacuation of occupants from a choice of multiple of emergency exits on each floor via vertical railroads attached to outside walls of the building each coupled, for the emergency, to its mobile unit having a railcar, its own power source, a drive mechanism, and controls.

Also by way of non-limiting example, U.S. Pat. No. 4,664,226 discloses an escape system for buildings which is comprised of at least one vertically disposed runner positioned preferably on the exterior of a building adapted to engage and support a removable power driven platform carriage which moves from floor to floor receiving trapped persons and delivering the same to safety levels. The driving power can be mechanical, electrical, manual, or combinations of thereof.

Also by way of non-limiting example, US 2016/362284 discloses a mobile lifting apparatus for raising and lowering one or more persons that may include a bottom tower section having a first bottom sidewall and an opposing second bottom sidewall. The apparatus may also have a top tower section coupled to and vertically translatable relative to the bottom tower section and a work platform translatable with the top carriage. The work platform may have a work surface with a first surface portion that is sized to accommodate at least one person standing on the first surface portion. An elevating assembly may be operable raise and lower the top tower section relative to the bottom tower section. The top tower section may be translatable to a lowered position in which the top carriage and the first surface portion are disposed laterally between the first and second bottom sidewalls.

Also by way of non-limiting example, GB 2,099,789 discloses one or more guide rails with a rack are permanently secured to the building, to assist in for evacuating a high rise building and fighting fires. A separable platform can be offered up to the guide rail 10 at its lower end and has a drive unit driving a pinion so as to be capable of climbing up and down the guide rail.

Also by way of non-limiting example, WO 94/05587 discloses a platform lift with a platform mounted on at least one upright so that it can be displaced vertically. The upright is made up of elements fitted one on top of the other. The platform is connected to the upright by a driven slide. In order to increase the range of applications of the platform lift, the lift is fitted with more uprights than slides and the slides and/or uprights have a coupling device designed to enable the platform to be selectively connected to different uprights.

GENERAL DESCRIPTION

According to a first aspect of the presently disclosed subject matter, there is provided a kit for providing an elevator system defining an elevator transport axis with respect to an exposed vertical face of a vertical structure, the kit comprising an elevator platform, a plurality of rail segment modules, a base structure and a rail segment stacking system, wherein:

- the rail segment modules each comprises a respective one or more elevator rail elements, and the rail segment modules are configured for being serially stacked contiguously with respect to one another via the rail segment stacking system to thereby provide a correspondingly progressively elongating mast stack wherein the respective said elevator rail elements are mutually aligned to form at least one contiguous vertical elevator rail parallel to the elevator transport axis, the rail segment modules being further configured for being in selectively secured engagement with respect to the vertical face in operation of the elevator system;
- the elevator platform is configured for being selectively transported along the mast stack parallel to the elevator transport axis via the at least one contiguous vertical elevator rail, in operation of the elevator system;
- the base structure is configured for being anchored with respect to a ground zone proximal to the vertical face, and having a module receiving station configured for selectively receiving each said rail segment module in turn from a rail segment module source, and for feeding in turn each received said rail segment module to the rail segment stacking system;
- the rail segment stacking system is configured for on-site coupling and bottom-to-top stacking of the rail segment modules fed thereto from the module receiving station to thereby provide the progressively elongating mast stack, and for selectively transporting the progressively elongating mast stack vertically and progressively further away from the ground zone after each said rail segment module is coupled and stacked thereto.

Thus, according to this aspect of the presently disclosed subject matter there is provided a kit that provides an elevator system defining an elevator transport axis with respect to an exposed vertical face of a vertical structure. The kit includes an elevator platform, rail segment modules having elevator rail element(s), a base structure and a rail segment stacking system. The rail segment modules can be serially stacked contiguously via the rail segment stacking system to provide a mast stack, forming contiguous vertical elevator rail(s) parallel to the elevator transport axis. The elevator platform can be transported along the mast stack via the vertical elevator rail. The base structure has a module receiving station which receives from a rail segment module source each rail segment module in turn, and feeds each one to the rail segment stacking system, allowing on-site coupling and bottom-to-top stacking of the fed rail segment modules, providing a progressively elongating mast stack, and transporting the progressively elongating mast stack vertically and progressively further away from the ground after each rail segment module is stacked thereto.

For example, the rail segment stacking system configured:

- for transporting a first said rail segment module away from the module receiving station thereby enabling a further said rail segment module to be received by the module receiving station from the rail segment module source;

for enabling successive said rail segment module fed thereto from the module receiving station to be coupled in turn to the currently last-transported said rail segment module to thereby sequentially stack in a bottom-to-top direction successive said rail segment modules fed from the module receiving station to form the progressively elongating mast stack, the mast stack having a progressively increasing vertical dimension correlated to the number of said rail segment modules stacked in the mast stack, and for transporting the mast stack including the just-coupled rail segment module away from the module receiving station thereby enabling a further said rail segment module to be received by the module receiving station.

Additionally or alternatively, for example, the rail segment stacking system comprises a frame support configured for enabling each said rail segment module to be fed therethrough from the module receiving station, and a drive system configured for progressively transporting the progressively elongating mast stack through the frame support in operation of the system.

In at least some examples, the drive system comprises a rack and pinion arrangement in cooperation with the rail segment modules, the drive system further comprises a motor drive system operatively coupled to the rack and pinion system, the rack and pinion arrangement comprising a first plurality of rack elements and a second plurality of pinions, wherein the rack elements are provided in the rail segment modules and the pinions are provided in the frame support. For example, the pinions are rotatably mounted with respect to the frame support and operatively coupled to the motor drive system. Additionally or alternatively, for example, each said rail segment module comprises at least one said rack element corresponding to each said pinion, the at least one said rack element being provided in respective said elevator rail elements such that when the rail segment modules are coupled and stacked in said mast stack the respective said rack elements corresponding to each said pinion are mutually aligned to provide the corresponding said at least one contiguous rack member, thereby enabling the mast stack to be translated in a linear direction responsive to the pinions being turned by the motor drive system.

In at least some other examples, the drive system comprises a rack and pinion arrangement in cooperation with the rail segment modules, the rack and pinion arrangement comprising a first plurality of rack elements and a second plurality of pinions, wherein the rack elements are provided in the frame support and the pinions are provided in the rail segment modules.

In at least some examples, the rail segment modules each comprises a respective one or more guide rail elements, configured to be mutually aligned to form corresponding one or more contiguous guide rails when the rail segment modules are serially stacked contiguously with respect to one another in the progressively elongating mast stack, and wherein the rail segment stacking system comprises a plurality of alignment rollers configured for cooperating with the one or more contiguous guide rails to maintain the rail segment stacking system aligned with respect to the mast stack.

In at least some examples, the rail segment stacking system is integrated with the elevator platform. For example, each said contiguous vertical elevator rail, is provided by at least one said contiguous rack member. Additionally or alternatively, for example, the kit comprises a locking arrangement for selectively locking and unlocking the elevator platform with respect to the base structure, wherein in the respective locked configuration, the rail segment stacking system can be operated for stacking and transporting the rail segment modules to provide the mast stack, and wherein in the respective unlocked configuration, the rail segment stacking system is configured for causing the elevator platform to be selectively transported along the mast stack via the at least one contiguous elevator rail, in operation of the elevator system.

In at least some other examples, the rail segment stacking system is fixedly mounted to the base structure, and is independent of the elevator platform. For example, the elevator platform is independent structurally and operationally with respect to the rail segment stacking system.

Additionally or alternatively, for example, the rail segment modules are each configured for being deployed between a stored configuration and a stacking configuration, wherein in the stowed configuration each respective rail segment module has a compact form relative to the stacked configuration, and wherein in the stacked configuration, the respective rail segment module is capable of being stacked with other said rail segment modules to provide the mast stack. For example, in said stowed configuration, each respective said rail segment module is circumscribed by a first envelope enclosing a first volume, and wherein in said stacked configuration, each respective said rail segment module is circumscribed by a second envelope enclosing a second volume, and wherein said second volume is greater than said first volume.

Alternatively, for example, the rail segment modules are each configured having a fixed geometry capable of enabling the rail segment modules to be stacked with respect to one another to provide the mast stack.

Additionally or alternatively, for example, each said rail segment module comprises a first coupling arrangement at a first longitudinal end thereof, and a second coupling arrangement at a second longitudinal end thereof, wherein the first coupling arrangement of each said rail segment module is configured for coupling with a said second coupling arrangement of another said rail segment module, and wherein the second coupling arrangement of each said rail segment module is configured for coupling with a said first coupling arrangement of another said rail segment module.

In at least some examples, each said rail segment module comprises a plurality of structural members interconnected in load bearing relationship. For example, each said structural member is in the form of a respective strut extending along an axial length of the respective rail segment module. Additionally or alternatively, for example, each said rail segment module comprises at least three said structural members, wherein each said structural member is in the form of a respective strut having a strut upper end and a respective lower strut end. For example, each said rail segment module comprises a first coupling member at one rail segment module end, and a second coupling member at another rail segment module end, wherein each said first coupling member is configured for being selectively coupled with a respective said second coupling member of another said rail segment module, and wherein each said second coupling member is configured for being selectively coupled with a respective said first coupling member of another said rail segment module.

In at least some examples, each rail segment module comprises a respective first said rack element fixedly mounted to a first said structural member, and a respective said second said rack element fixedly mounted to a second said structural member. For example, for each said rail segment the respective said first said structural member and the respective said second structural member are in fixed transversely spaced relationship. Additionally or alternatively, for example, each said rail segment module comprises at least a third said structural member laterally spaced from said first structural member and said second structural member by a segment lateral spacing. For example, for each said rail segment the respective said first said structural member and the respective said second structural members are movably mounted with respect to the respective said third structural member, and movable between an undeployed configuration and a deployed configuration, wherein in the undeployed configuration each respective rail segment module has a compact form relative to the deployed configuration, and wherein in the deployed configuration, the respective rail segment module is capable of being stacked with other said rail segment modules to provide the mast stack.

Additionally or alternatively, for example, the rail segment modules are configured for being in selectively secured engagement with respect to the vertical face via a plurality of lateral load bearing elements previously provided on the vertical face. For example, said lateral load bearing elements each comprises a load bearing end projecting laterally from the vertical face, and wherein each said rail segment module comprises at least one lateral load bearing rail element configured such that when the rail segment modules are coupled and stacked in said mast stack the respective said at least one lateral load bearing rail elements are mutually aligned to provide the corresponding said at least one contiguous lateral load bearing rail member, the least one contiguous lateral load bearing rail member being configured for enabling sliding engagement with the load bearing ends of the plurality of said lateral load bearing elements in a manner allowing relative translation between the at least one contiguous lateral load bearing rail member and the load bearing ends in a first degree of freedom while preventing free relative movement between the at least one contiguous lateral load bearing rail member and the load bearing ends in a second degree of freedom and in a third degree of freedom orthogonal to the first degree of freedom, wherein the first degree of freedom is parallel to the elevator transport axis.

Additionally or alternatively, for example, the kit further comprises a dispenser module configured for selectively engaging a plurality of lateral load bearing elements with respect to the vertical face, concurrent with the mast stack being assembled via the elevator rail assembly structure. For example, said lateral load bearing elements each comprises a load bearing end configured for projecting laterally from the vertical face when the respective lateral load bearing element is engaged with respect to the vertical face, and an engaging end configured for being selectively engaged with respect to the vertical face when dispensed via the dispenser module. For example, the vertical face comprises a plurality of glass panels, and the respective engaging ends each correspondingly comprise a plurality of suction cups configured for engagement with the glass panels. Alternatively, for example, the vertical face comprises a plurality of ferrous metal structural elements, and the respective engaging ends each correspondingly comprises a plurality of magnetic elements configured for magnetic engagement with the ferrous metal structural elements. Alternatively, for example, the vertical face comprises a plurality of concrete or stone structural elements, and the respective engaging ends each correspondingly comprises a plurality of nails or screws configured for engagement with the concrete or stone structural elements. Additionally or alternatively, for example, the dispenser module is configured for serially dispensing the lateral load bearing elements into engaging relationship with respect to the vertical face. For example, the dispenser module comprises at least one dispenser magazine configured for accommodating a plurality of said lateral load bearing elements, and an applicator configured for selectively dispensing each said lateral load bearing element from said at least one magazine and for engaging the dispensed said lateral load bearing element with respect to the vertical face.

Additionally or alternatively, for example, each said rail segment module comprises at least one lateral load bearing rail element configured such that when the rail segment modules are coupled and stacked in said mast stack the respective said at least one lateral load bearing rail elements are mutually aligned to provide the corresponding said at least one contiguous lateral load bearing rail member, the least one contiguous lateral load bearing rail member being configured for enabling sliding engagement with the load bearing ends of the plurality of said lateral load bearing elements in a manner allowing relative translation between the at least one contiguous lateral load bearing rail member and the load bearing ends in a first degree of freedom while preventing free relative movement between the at least one contiguous lateral load bearing rail member and the load bearing ends in a second degree of freedom and in a third degree of freedom orthogonal to the first degree of freedom, wherein the first degree of freedom is parallel to the elevator transport axis.

Additionally or alternatively, for example, said dispenser module is configured for being carried by a thereby modified said rail segment module. For example, said dispenser module is mounted atop a first said rail segment module.

Additionally or alternatively, for example, the kit further comprises a fire extinguishing system 800.

According to a second aspect of the presently disclosed subject matter there is provided a rail segment module, for use with a kit as defined herein with respect to the first aspect of the presently disclosed subject matter.

According to a third aspect of the presently disclosed subject matter there is provided an elevator platform for use with a kit as defined herein with respect to the first aspect of the presently disclosed subject matter.

According to a fourth aspect of the presently disclosed subject matter there is provided a base structure for use with a kit as defined herein with respect to the first aspect of the presently disclosed subject matter.

According to a fifth aspect of the presently disclosed subject matter there is provided a rail segment stacking system for use with a kit as defined herein with respect to the first aspect of the presently disclosed subject matter.

According to a sixth aspect of the presently disclosed subject matter there is provided an elevator system provided by a kit as defined herein with respect to the first aspect of the presently disclosed subject matter.

According to a seventh aspect of the presently disclosed subject matter there is provided an elevator rail assembly structure configured for on-site stacking of the rail segment modules to provide a progressively elongating mast stack, the elevator rail assembly structure comprising a base structure and a rail segment stacking system, wherein:

the base structure is configured for being anchored with respect to a ground zone proximal to the vertical face, and having a module receiving station configured for selectively receiving each said rail segment module in turn from a rail segment module source, and for feeding in turn each received said rail segment module to the rail segment stacking system;

the rail segment stacking system is configured for on-site coupling and bottom-to-top stacking of the rail segment modules fed thereto from the module receiving station to thereby provide the progressively elongating mast stack, and for selectively transporting the progressively elongating mast stack vertically and progressively further away from the ground zone after each said rail segment module is coupled and stacked thereto.

For example, the rail segment stacking system is configured:

for transporting a first said rail segment module away from the module receiving station thereby enabling a further said rail segment module to be received by the module receiving station from the rail segment module source;

for enabling successive said rail segment module fed thereto from the module receiving station to be coupled in turn to the currently last-transported said rail segment module to thereby sequentially stack in a bottom-to-top direction successive said rail segment modules fed from the module receiving station to form the progressively elongating mast stack, the mast stack having a progressively increasing vertical dimension correlated to the number of said rail segment modules stacked in the mast stack, and for transporting the mast stack including the just-coupled rail segment module away from the module receiving station thereby enabling a further said rail segment module to be received by the module receiving station.

According to an eighth aspect of the presently disclosed subject matter there is provided a dispenser module configured for selectively engaging a plurality of lateral load bearing elements with respect to a vertical face, concurrent with a mast stack being assembled via an elevator rail assembly structure. For example, said lateral load bearing elements each comprises a load bearing end configured for projecting laterally from the vertical face when the respective lateral load bearing element is engaged with respect to the vertical face, and an engaging end configured for being selectively engaged with respect to the vertical face when dispensed via the dispenser module. For example, the vertical face comprises a plurality of glass panels, and the respective engaging ends each correspondingly comprise a plurality of suction cups configured for engagement with the glass panels. Alternatively, for example, the vertical face comprises a plurality of ferrous metal structural elements, and the respective engaging ends each correspondingly comprises a plurality of magnetic elements configured for magnetic engagement with the ferrous metal structural elements. Alternatively, for example, the vertical face comprises a plurality of concrete or stone structural elements, and the respective engaging ends each correspondingly comprises a plurality of nails or screws configured for engagement with the concrete or stone structural elements. Additionally or alternatively, for example, the dispenser module is configured for serially dispensing the lateral load bearing elements into engaging relationship with respect to the vertical face. For example, the dispenser module comprises at least one dispenser magazine configured for accommodating a plurality of said lateral load bearing elements, and an applicator configured for selectively dispensing each said lateral load bearing element from said at least one magazine and for engaging the dispensed said lateral load bearing element with respect to the vertical face.

According to a ninth aspect of the presently disclosed subject matter there is provided a method for providing an elevator system with respect to an exposed vertical face of a vertical structure, the method comprising:

(a) providing a kit as defined herein with respect to the first aspect of the presently disclosed subject matter;

(b) selectively inserting a first said rail segment module into the module receiving station, and causing the module receiving station to feed the first said rail segment module into the rail segment stacking system;

(c) selectively inserting a next said rail segment module into the module receiving station, and causing the module receiving station to feed the received said rail segment module into the rail segment stacking system, and concurrently coupling the just-fed said rail segment module to the currently last-transported said rail segment module to thereby sequentially stack in a bottom-to-top direction successive said rail segment modules fed from the module receiving station to form the mast stack;

(d) transporting the mast stack including the just-coupled said rail segment module away from the module receiving station thereby enabling a further said rail segment module to be received by the module receiving station;

(e) securing the just-coupled said rail segment module to the vertical face;

(f) repeating steps (c), (d) and (e) until in step (c) a final said rail segment module is inserted into the module receiving station.

For example, the method further comprises the step:

(g) applying steps (d) and (e) to the final said rail segment module inserted into the module receiving station in step (c).

For example, the method further comprises the step:

(h) securing the final said rail segment module to the ground zone.

For example, the method further comprises the step:

(i) removing the base structure from the ground zone.

Additionally or alternatively, For example, the method further comprises the step:

(j) mounting the elevator platform to the mast stack, and selectively operating the elevator system to cause the elevator platform to be vertically transported along the vertical mast stack via the at least one contiguous vertical elevator rail.

Additionally or alternatively, For example, the method further comprises the step:

(k) wherein the rail segment stacking system is mounted to the elevator platform to the mast stack, and selectively operating the elevator system to cause the elevator platform to be vertically transported along the vertical mast stack via the at least one contiguous vertical elevator rail.

BRIEF DESCRIPTION OF THE DRAWINGS

In order to better understand the subject matter that is disclosed herein and to exemplify how it may be carried out in practice, examples will now be described, by way of non-limiting example only, with reference to the accompanying drawings, in which:

FIG. 4(*b*) is a side view of the example of FIG. 3, intermediate between an undeployed configuration and a deployed configuration; FIG. 4(*c*) is a side view of the example of FIG. 3, in undeployed configuration.

FIG. 5(*b*) is a top view of the example of FIG. 3, in deployed configuration.

FIG. 6(*b*) is a front partial view of the example of FIG. 6(*a*), in which the two rail segment modules are engaged to one another.

FIG. 8(*b*) is a perspective view of the example of FIG. 7 in operational configuration and with a rail segment module received in the module receiving station; FIG. 8(*c*) is a perspective view of the example of FIG. 7, in operational configuration, and in which the trolley base has been moved in an upward direction to a feeding position.

FIG. 9(*b*) is a front view of the example of FIG. 7 in operational configuration and with a rail segment module received in the module receiving station; FIG. 9(*c*) is a front view of the example of FIG. 7, in operational configuration, and in which the trolley base has been moved in an upward direction to a feeding position.

FIG. 11(*a*) is a perspective detail partial view of the example of FIG. 11.

FIG. 19(*b*) is a back perspective view of the example of FIG. 19(*a*); FIG. 19(*c*) is a cross-sectional view of the example of FIG. 19(*a*).

FIG. 20(*b*) is a back perspective partial view of FIG. 20(*a*), in which the applicators operate to push the respective lateral load bearing element into abutting contact with a respective glass panel of the vertical face;

FIG. 20(*c*) is a back perspective partial view of FIG. 20(*a*), in which the applicators further operate to press the respective lateral load bearing element onto the glass panels to ensure adhesion therebetween; FIG. 20(*d*) is a back perspective partial view of FIG. 20(*a*), in which the dispenser module is upwardly displaced away from the dispensed lateral load bearing element, allowing another lateral load bearing element to be received in the dispensing station.

FIG. 21(*b*) is a back perspective partial view of FIG. 21(*a*), in which the applicators operate to engage the bolts or screws with respect to the vertical face via the lateral load bearing element residing at the dispensing station; FIG. 21(*c*) is a back perspective partial view of FIG. 21(*a*), in which the applicators further operate to press the lateral load bearing element into full load bearing abutment with respect to the vertical face; FIG. 21(*d*) is a back perspective partial view of FIG. 21(*a*), in which the dispenser module is upwardly displaced away from the dispensed lateral load bearing element, allowing another lateral load bearing element to be received in the dispensing station.

FIG. 22(*b*) schematically illustrates in side view another step in the assembly example of FIG. 22(*a*), in which the support structure is delivered to the ground zone; FIG. 22(*c*) schematically illustrates in side view another step in the assembly example of FIG. 22(*a*), in which the support structure is deployed and anchored to the ground zone; FIG. 22(*d*) schematically illustrates in side view another step in the assembly example of FIG. 22(*a*), in which a first rail segment module is being delivered to the support structure; FIG. 22(*e*) schematically illustrates in side view another step in the assembly example of FIG. 22(*a*), in which a first rail segment module has been transported by the rail segment stacking system, and another rail segment module is ready for being received by the support structure.

FIG. 23(*b*) schematically illustrates in side view another step in the assembly example of FIG. 23(*a*), in which a first rail segment module has been transported by the rail segment stacking system; FIG. 23(*c*) schematically illustrates in side view another step in the assembly example of FIG. 23(*a*), in which another rail segment module has been received in the support structure; FIG. 23(*d*) schematically illustrates in side view another step in the assembly example of FIG. 23(*a*), in which the mast stack has reached a desired height via transport through the rail segment stacking system; FIG. 23(*e*) schematically illustrates in side view operation of the assembly example of FIG. 23(*a*), in which the elevator platform moves vertically with respect to the mast stack.

DETAILED DESCRIPTION

Figure 1:
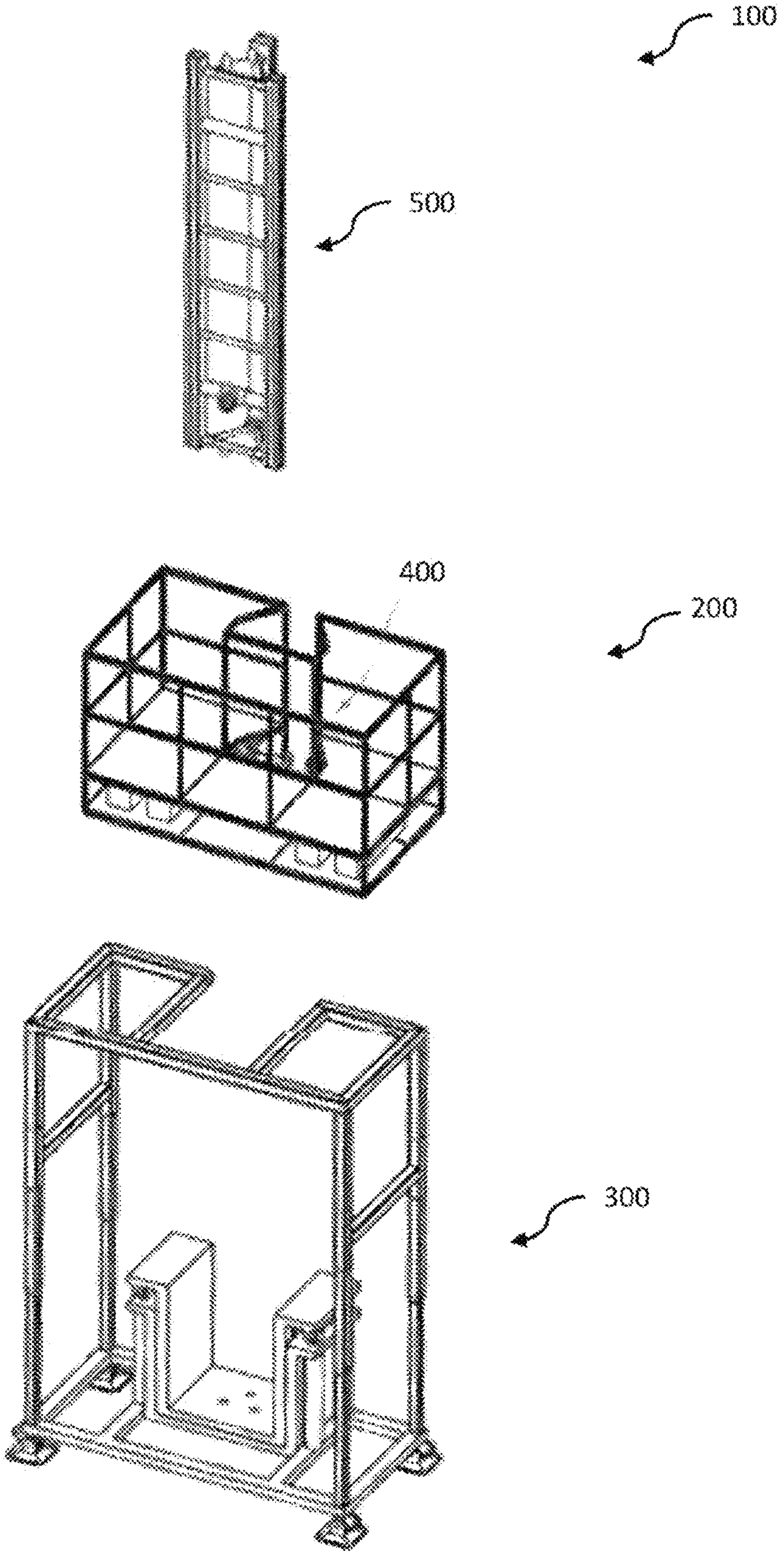
FIG. 1 is a perspective view of elements of a kit according to a first example of the presently disclosed subject matter.
Figure 2:
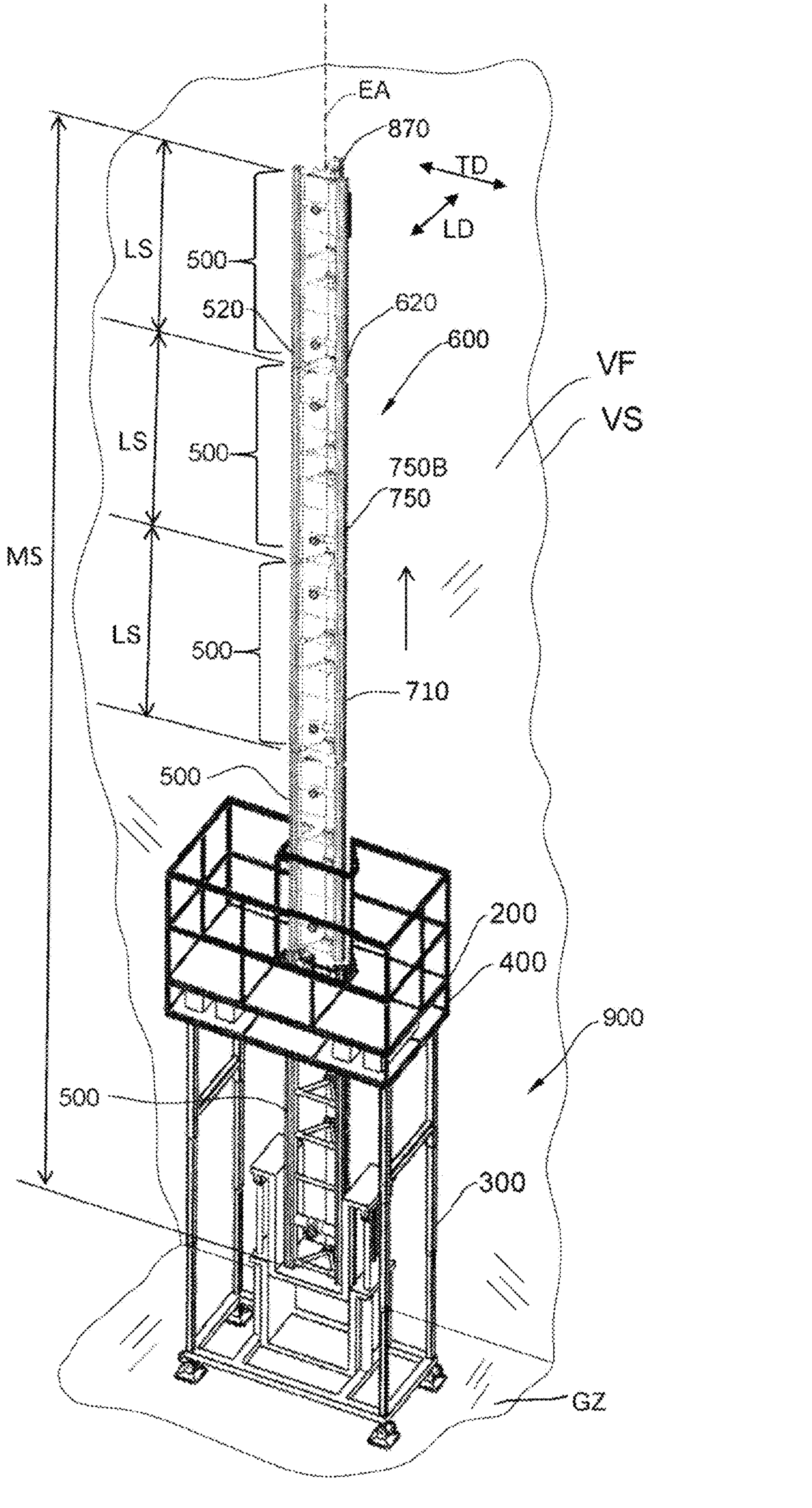
FIG. 2 is a perspective view of an example of an elevator system assembled from the kit of the example of FIG. 1.

Referring to FIGS. 1 and 2, a kit according to a first example of the presently disclosed subject matter, generally designated 100, comprises an elevator platform 200, a plurality of rail segment modules 500, a base structure 300 and a rail segment stacking system 400. As will become clearer herein, the kit 100 is configured for providing an elevator system 900 defining an elevator transport axis EA with respect to an exposed vertical face VF of a vertical structure VS.

The elevator transport axis EA, also interchangeably referred to herein as the elevator axis, is defined as the axis along which the elevator platform 200 is transported in operation of the elevator system 900, the elevator platform 200 being typically reciprocably transportable along the elevator axis EA.

Also as will become clearer herein, such an elevator system 900 can be assembled in-situ from the kit 100 adjacent any suitable vertical structure VS, and in a relatively short time, and can be operated for a variety of uses. Such uses can include, for example, one or more of: fire extinguishing and/or rescue from tall buildings and the like; access to external parts of tall buildings, pylons and other structures; delivery of articles to a location (for example an apartment) in a building via an external window or other opening wherein such articles cannot be delivered via the inside of the building to the apartment. The vertical structure is not limited to buildings, and can include other types of structures, for example dams, walls, pylons and so on.

Also as will become clearer herein, such an elevator system 900 can be configured for being assembled in-situ from the kit 100 in secured engagement with respect to the vertical face VF in operation of the elevator system 900, in which no special modifications need to be made to the respective vertical structure VS prior to assembly of the elevator system 900.

Also as will become clearer herein, such an elevator system 900 can be configured for being assembled in-situ from the kit 100 in secured engagement with respect to the vertical face VF in operation of the elevator system 900, such that lateral loads and/or transverse loads on the elevator system 900 can be supported by the vertical structure VS via the vertical face VF. Furthermore, the elevator system 900 can be adapted for use with a variety of different types of vertical structure VS, for example building structures having an external facia or structure made from one or more of concrete, stone, wood, glass or metal, such an external facia or structure defining the vertical face VF.

Also as will become clearer herein, such an elevator system 900 can be configured, at least in some examples, for being selectively disassembled and removed from the vertical structure VS, for example when no longer needed.

Also as will become clearer herein, in at least some examples, such a kit 100 can be transported to the required site of the vertical structure VS when needed, for example via a truck or the like.

Figure 3:
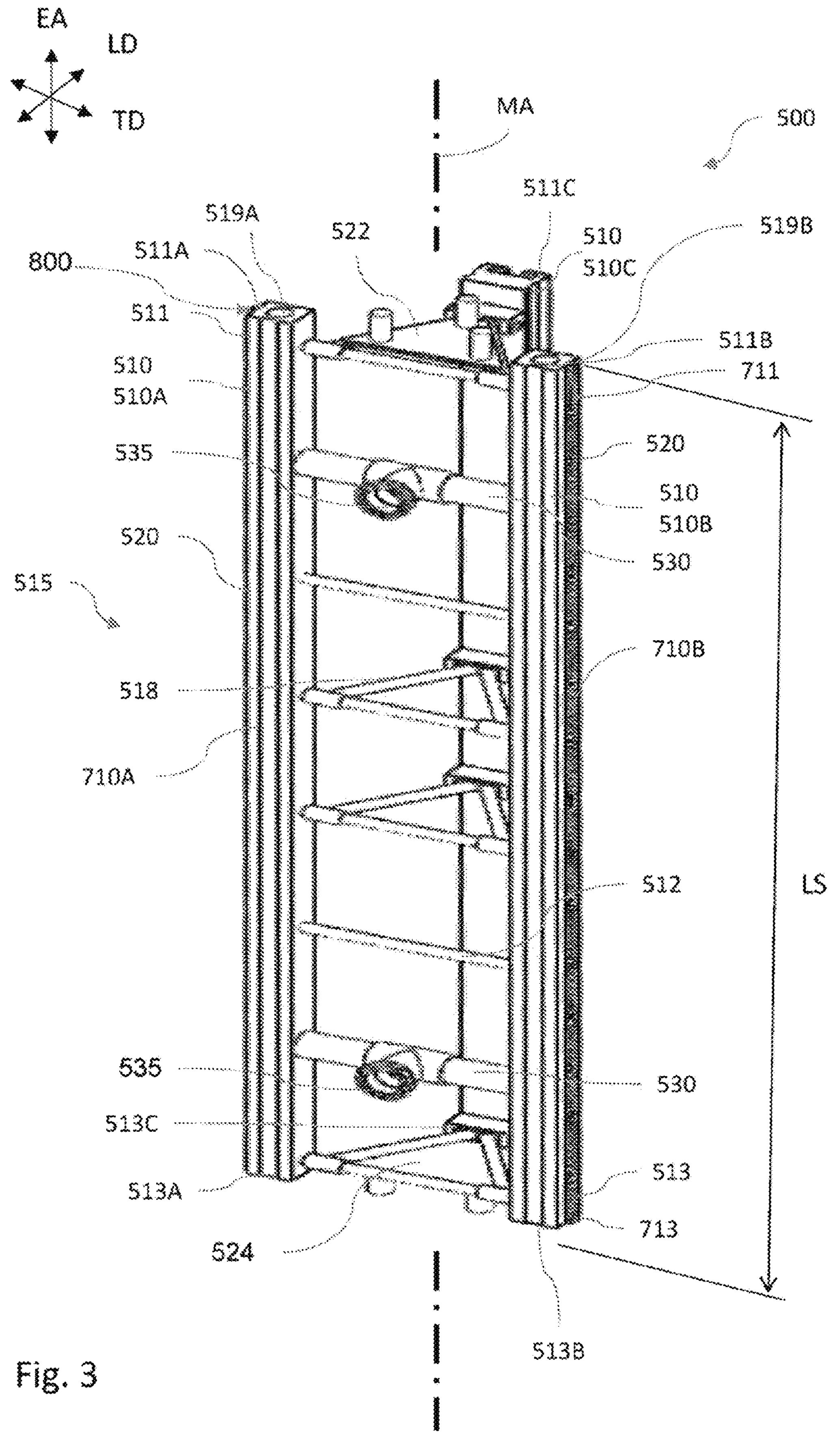
FIG. 3 is a perspective view of an example of a rail segment module comprised in the kit of the example of FIG. 1.

Referring to FIG. 2 and FIG. 3, and as will become clearer herein, the rail segment modules 500 each comprises a respective one or more elevator rail elements 520, and the rail segment modules 500 are configured for being serially stacked contiguously with respect to one another via the rail segment stacking system 400 to thereby provide a correspondingly progressively elongating mast stack 600, wherein the respective elevator rail elements 520 are mutually aligned to form at least one contiguous vertical elevator rail 620 parallel to the elevator transport axis EA.

It is to be noted that the kit 100 can include any desired number of rail segment modules 500. In general, the number N of rail segment modules 500 used for providing a particular implementation of the elevator system 900 will depend on the effective longitudinal module dimension LS of each rail segment module 500 in a direction parallel to the elevator axis EA and on the height above the ground zone GZ that it is desired for the elevator platform 200 to reach using the elevator system 900, i.e., during regular operation of the elevator system 900.

Each rail segment module 500 has a respective longitudinal module axis MA, and the plurality of rail segment modules 500 are configured to be serially stacked in a typically vertical direction such that the respective longitudinal module axes MA are parallel and aligned with the elevator axis EA, to provide the mast stack 600.

It is to be noted that the terms "vertical", "vertically" and so on, while typically relating to an axis that is aligned or parallel with the gravitational direction, in at least some examples this term can also include an axis that is inclined with respect to the gravitational direction at an inclination angle less than 90°, typically at an acute inclination angle. In at least the illustrated example, such an inclination angle can be for example in any one of the following range: ±20°; ±15°; ±10°; ±5°; ±2°; ±1°; or less than ±10°.

In at least the illustrated example, the rail segment modules 500 are nominally identical to one another, and thus can be serially stacked in any order, though as will become clearer herein the rail segment modules 500 are stacked in a bottom-to-top manner to provide the mast stack 600.

By "bottom-to-top" stacking is meant that each additional rail segment module 500 is mounted to the bottom of the mast stack 600, which after such addition increases the axial length of the mast stack 600, and, as will become clearer herein, such a "progressively elongating" mast stack 600 is moved in "bottom-to-top" upward manner to allow each additional rail segment module 500 to be inserted and affixed to the bottom end of the current mast stack 600 to thereby increase the axial length of the mast stack 600.

Each rail segment module 500 is configured for supporting respective static as well as dynamic mechanical loads relating to the elevator system 900 and operation thereof, in particular along the elevator axis EA. For example, such static forces can include the weight of all components of the system 900 above the respective rail segment module 500, including all the other rail segment module 500 in the mast stack 600 above the respective rail segment module, and also including the elevator platform 200 and any payload transported by the elevator platform 200. For example, such dynamic forces can include dynamic forces arising due to the movement of the elevator platform 200 during transportation thereof along the elevator axis EA, and/or due to the stacking of the rail segment modules 500 to form the mast stack 600, and/or transportation of the mast stack 600 during assembly of the system 900, and/or wind-induced loads. Thus, each rail segment module 500 can be made from any suitable load bearing materials, including for example any one of steel, aluminium, carbon fiber composites, and so on.

According to an aspect of the presently disclosed subject matter, and as will become clearer herein, the rail segment modules 500 are also configured for being in selectively secured engagement with respect to the vertical face VF in operation of the elevator system 900, and this secured engagement enables mechanical loads in a lateral direction LD and/or in a transverse direction TD to be supported during assembly as well as during operation of the elevator system 900.

The aforesaid lateral direction LD and transverse direction TD are orthogonal to one another, and both the lateral direction LD and transverse direction TD can be defined as also orthogonal to the elevator axis EA or to the gravitational direction. For example the aforesaid lateral direction LD can be orthogonal to the vertical face VF and generally horizontal, while the transverse direction TD can be parallel to the vertical face VF and generally horizontal.

Referring again to FIG. 3, each rail segment module 500 has an effective longitudinal module dimension LS in a direction parallel to the elevator axis EA, such that when a plurality of N rail segment modules 500 are stacked with respect to one another, the resulting mast stack 600 has an effective longitudinal mast dimension MS given by the product N*LS.

In at least this example, each rail segment module 500 comprises a plurality of structural members 510 interconnected in load bearing relationship. The structural members 510 are configured for, inter alia, providing structural integrity and for enabling the aforesaid mechanical loads to be supported.

In at least this example, the plurality of structural members 510 includes a first structural member 510, specifically denoted with reference numeral 510A, a second structural member 510, specifically denoted with reference numeral 510B, and a third structural member 510, specifically denoted with reference numeral 510C, in which the three structural members 510A, 510B, 510C are interconnected in a load bearing manner. It is to be noted that in alternative variations of this example, the plurality of structural members can include any suitable number of structural members 510 according to the specific implementation of the elevator system 900, for example; in such cases the plurality of structural members can include for example a single structural member, or two structural members or more than three structural members.

In at least this example, each rail segment module 500 has a braced frame construction, in which the three structural members 510A, 510B, 510C are in the form of respective load bearing struts or columns, each extending along an axial length of the respective rail segment module 500, i.e., along the effective longitudinal module dimension LS.

The first structural member 510A, in at least this example in the form of a column or strut, has a respective strut upper end 511A and a respective strut lower end 513A, at opposed longitudinal ends of the rail segment module 500.

The second structural member 510B, in at least this example in the form of a column of strut, has a respective strut upper end 511B and a respective strut lower end 513B, at opposed longitudinal ends of the rail segment module 500.

The third structural member 510C, in at least this example in the form of a column of strut, has a respective strut upper end 511C and a respective strut lower end 513C, at opposed longitudinal ends of the rail segment module 500.

In at least this example, the first structural members 510A and the second structural member 510B support the main loads along the elevator axis EA, and are interconnected via a plurality of horizontal beams 512 via rigid joints to form a rail guide support assembly 515. Thus, in at least this example, the first lateral member 510A is transversely spaced with respect to the second structural member 510B by a respective fixed transverse spacing TS1 (FIG. 5(*a*)). In alternative variations of this example, the two structural members 510A, 510B can be further braced, for example via one or more of cross braces, V braces, inverted V braces, diagonal braces or eccentric braces.

As will become clearer herein, the one or more elevator rail elements 520 are fixed to and supported by rail guide support assembly 515.

Figure 5A:
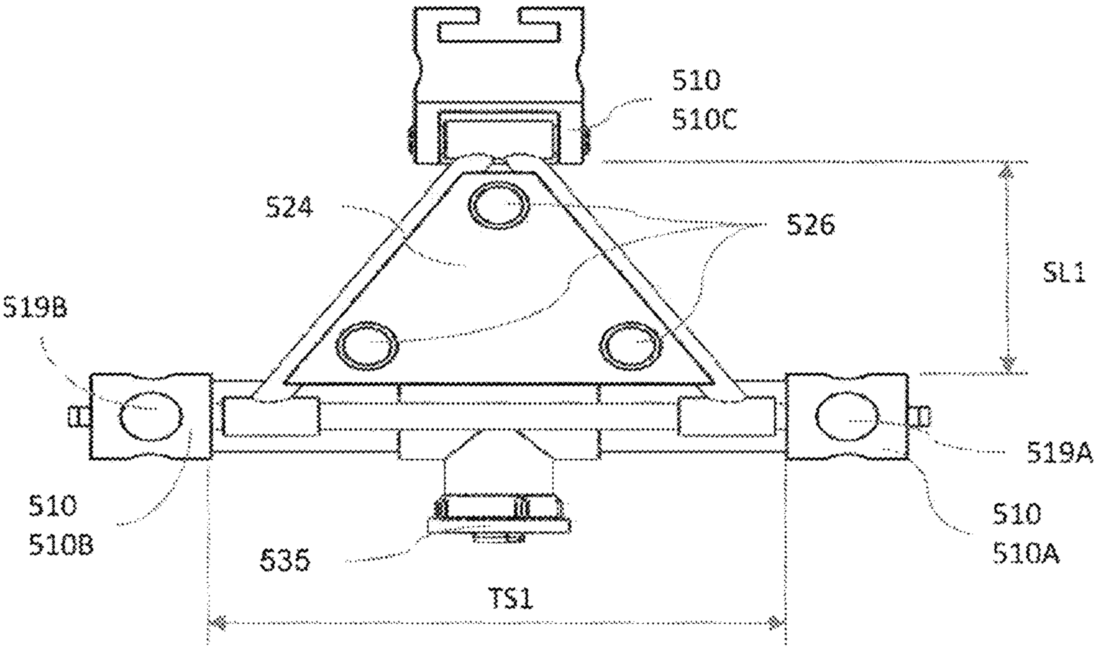
FIG. 5(*a*) is a bottom view of the example of FIG. 3, in deployed configuration.
Figure 5B:
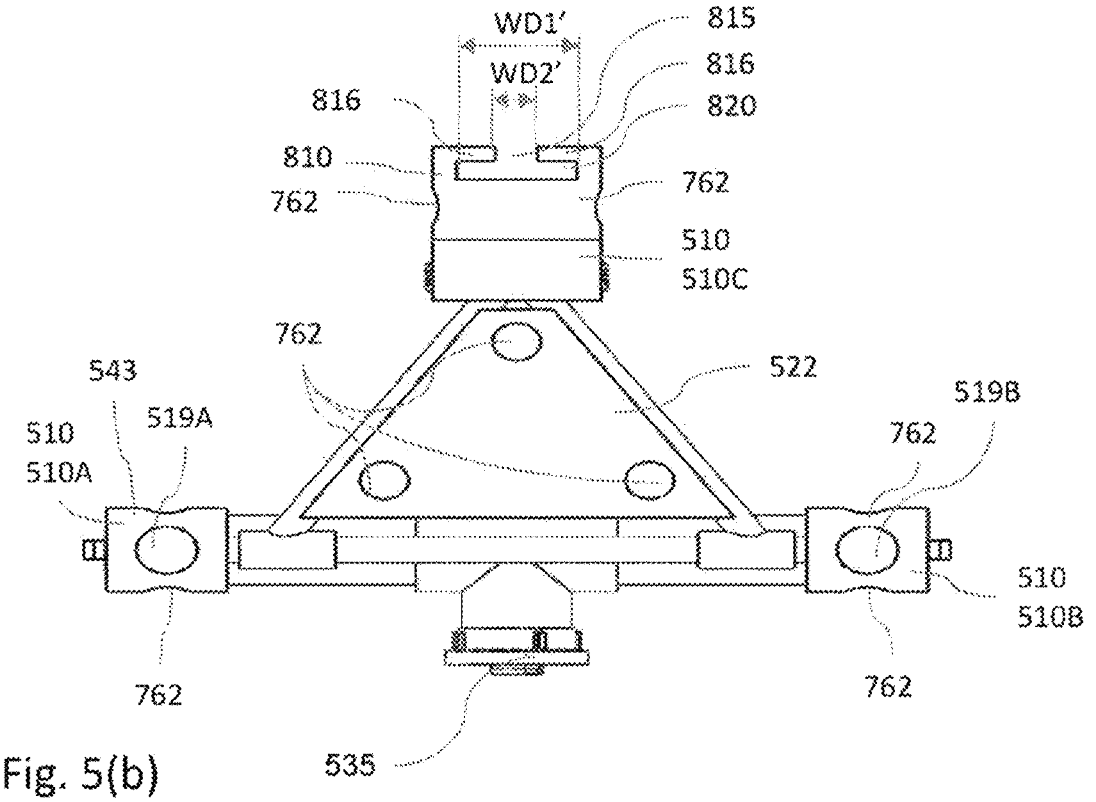

In at least this example, the third structural member 510C is laterally spaced from the first structural member 510A and from the second structural member 510B by a segment lateral spacing SL1 (FIG. 5(*a*)).

The third structural member 510C is connected to the rail guide support assembly 515 via cross-struts 518, such that at least in operation of the elevator system the three structural members 510A, 510B, 510C are nominally parallel to one another, and laterally and transversely spaced with respect to one another in triangular spaced relationship, as best seen in FIGS. 5(*a*) and 5(*b*).

Figures 4A, 4B, 4C:
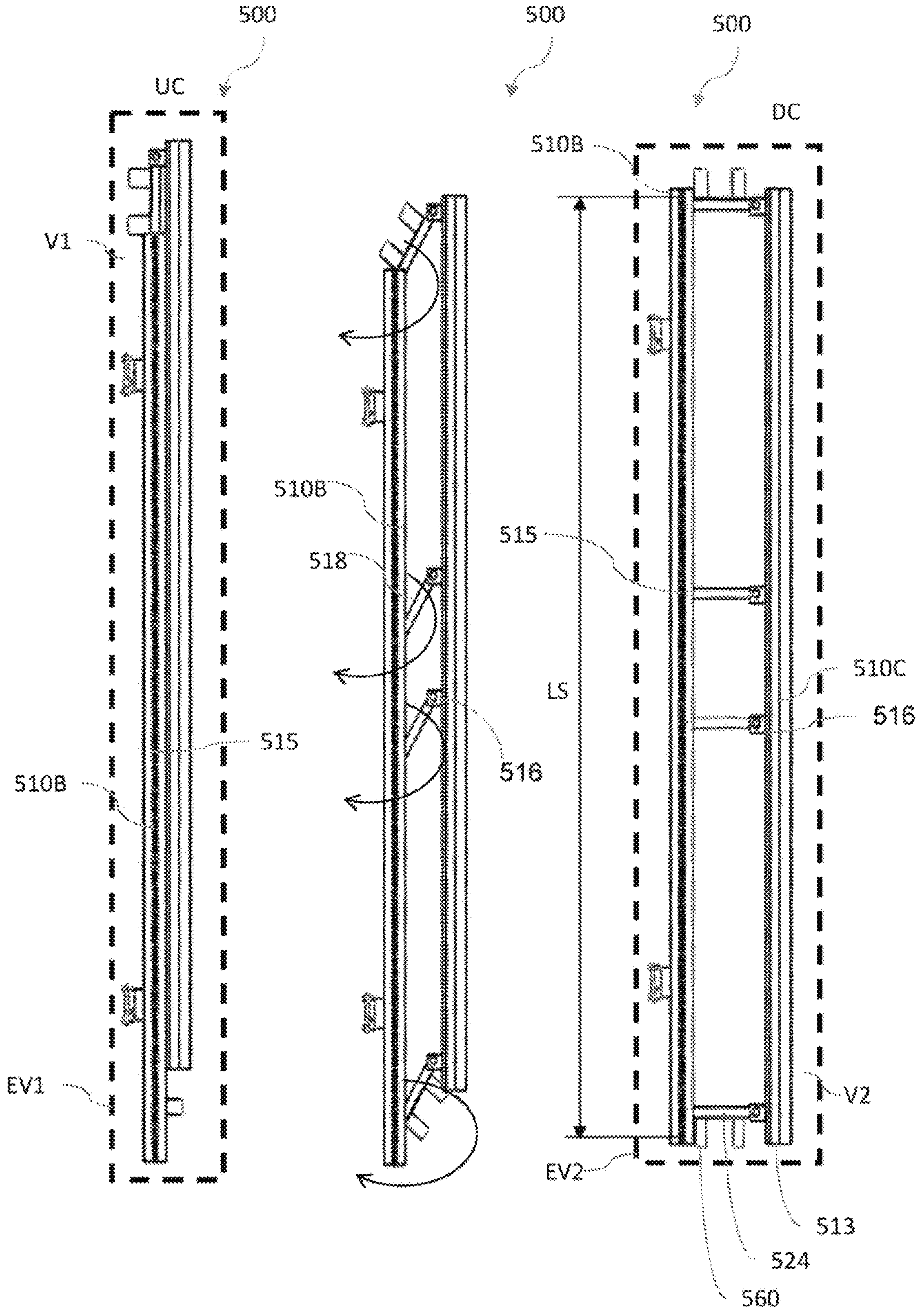
FIG. 4(*a*) is a side view of the example of FIG. 3, in deployed configuration.

In at least this example, and referring to FIGS. 4(*a*), 4(*b*) and 4(*c*), the rail segment modules 500 each have a deployable configuration, i.e., each segment module 500 is configured for being (optionally reversibly) deployed between a respective undeployed configuration (also referred to interchangeably herein as a stored configuration) UC, illustrated in FIG. 4(*c*), and a respective deployed configuration (also referred to interchangeably herein as a stacking configuration) DC, illustrated in FIG. 4(*a*). FIG. 4(*b*) illustrates an intermediate position between the undeployed configuration UC and the deployed configuration DC. This deployment feature can enable less storage space to be required for storing and transporting the rail segment modules 500, for example.

However, in at least some alternative variations of this example, the respective rail segment modules are each configured having a fixed geometry, for example corresponding to the geometry of the aforesaid deployed configuration DC, capable of enabling the respective rail segment modules to be stacked with respect to one another to provide the respective mast stack. At least in some cases, this feature can lead to lower manufacturing costs and/or lower maintenance costs, as compared with a corresponding deployable configuration, for example.

Referring again to FIG. 4(*c*), in the undeployed configuration UC each respective rail segment module 500 has a compact form relative to the deployed configuration, for example in which the segment lateral spacing is at a minimum. In the deployed configuration DC, the respective rail segment module 500 has an expanded load-bearing form, in which segment lateral spacing conforms to segment lateral spacing SL1. In the deployed configuration DC, the respective rail segment module 500 is capable of being stacked with other said rail segment modules 500 to provide the mast stack 600.

Referring again to FIGS. 4(*a*) and 4(*c*), in the undeployed configuration UC, each respective rail segment module 500 is circumscribed by a first envelope EV1 enclosing a first volume V1, whereas in the deployed configuration, each respective rail segment module 500 is circumscribed by a second envelope EV2 enclosing a second volume V2. The second volume V2 is greater than the first volume V1.

In at least this example, and referring again also to FIG. 4(*b*), each rail segment module 500 can transit between the deployed configuration DC and the undeployed configuration UC via a pivoting operation. In each rail segment module 500, the respective rail guide support assembly 515 is movably mounted with respect to the respective third structural member 510C in a parallelogram manner via the cross-struts 518. In other words, the cross-struts 518 are each pivotably mounted at one end thereof to the respective rail guide support assembly 515 via one set of hinges (not shown), and at the other end thereof to the respective third structural member 510C via another set of hinges 516.

In at least this example, and referring in particular to FIGS. 3, 4(*a*), 5(*a*) and 5(*b*), each rail segment module 500 comprises end plates including an upper end plate 522 and a lower end plate 524 at longitudinally opposed upper end 511 and lower end 513 of the respective rail segment module 500. The end plates 522, 524 are each pivotably mounted at one end thereof to the respective rail guide support assembly 515, and at the other end thereof to the respective third structural member 510C, and pivot in the same manner as the cross-struts 518, together enabling the respective rail segment module 500 to transit between the deployed configuration DC and the undeployed configuration UC. In the deployed configuration, the end plates 522, 524 are load bearing with respect to the respective rail guide support assembly 515 and the respective third structural member 510C.

For each rail segment module 500, concurrent pivoting of the cross-struts 518 and end plates 522, 524 in one direction results in the respective rail guide support assembly 515 being laterally spaced from the respective third structural member 510C by segment lateral spacing SL1 to thereby provide the deployed configuration DC. Pivoting of the cross-struts 518 in the opposite direction results in the respective rail guide support assembly 515 being brought laterally closer to the respective third structural member 510C to thereby provide the undeployed configuration UC.

Figure 6A:
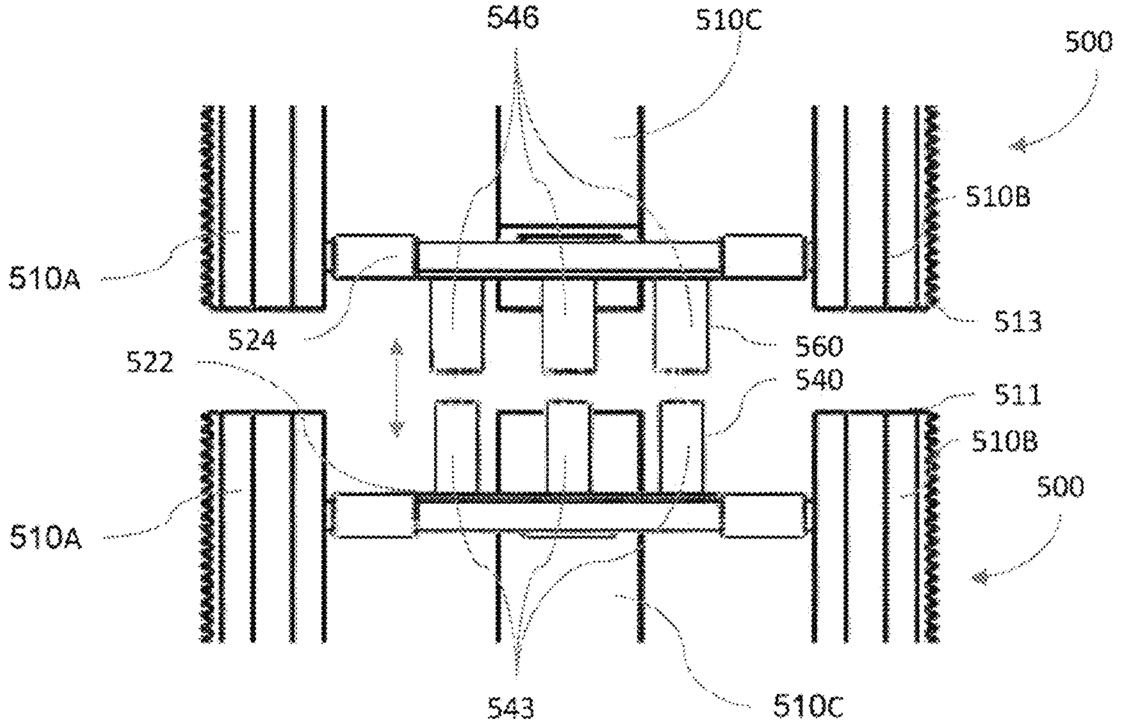
FIG. 6(*a*) is a front partial view of two rail segment modules according to the example of FIG. 3, in close axial proximity to one another.
Figure 6B:
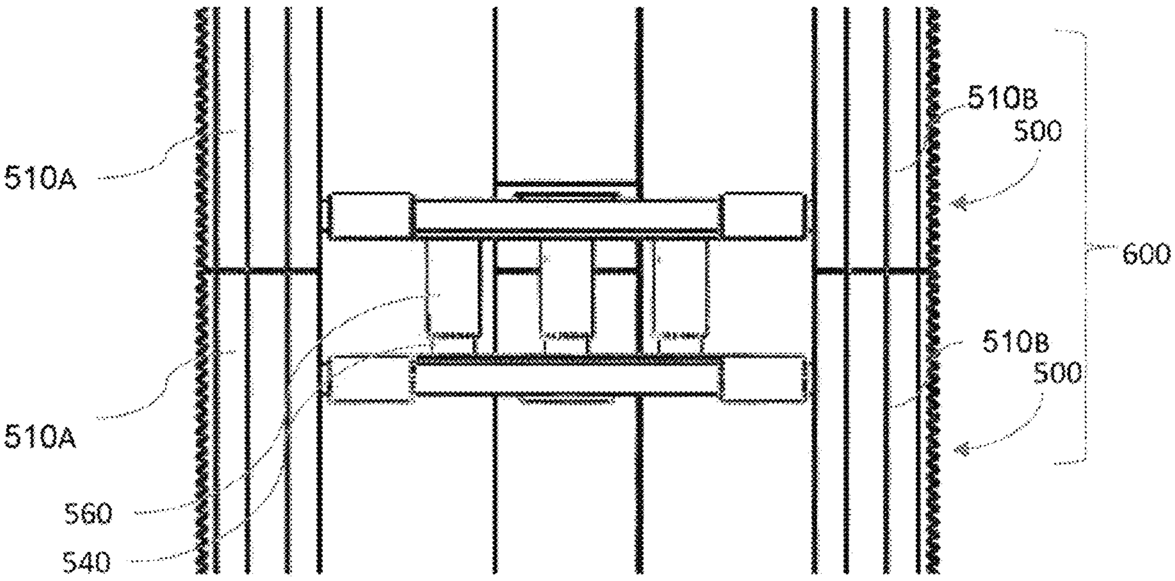

Referring also to FIGS. 6(*a*) and 6(*b*), each said rail segment module 500 comprises a first coupling arrangement 540 at a first longitudinal end 511 of the respective rail segment module 500, and a second coupling arrangement 560 at a second longitudinal end 513 of the respective rail segment module 500.

The first coupling arrangement 540 of each rail segment module 500 is configured for coupling with a second coupling arrangement 560 of another rail segment module 510. Similarly, the second coupling arrangement 560 of each rail segment module 500 is configured for coupling with a first coupling arrangement of another rail segment module 500.

The first coupling arrangement and the second coupling arrangement can take any suitable form that enables the first coupling arrangement of one rail segment module to be reversibly or irreversibly coupled to the second coupling arrangement of another rail segment module, and thus many different varieties of such coupling arrangements can be used. For example, the first coupling arrangement and the second coupling arrangement can be in the form of nuts and bolts that enable the adjacent rail segment modules to be coupled to one another, or can be in the form of mechanical latches, or can be in the form of welds or in any other suitable form.

In at least this example, the first coupling arrangement 540 is in the form of a plurality of male elements 543, that are affixed to and face away from the first end plate 522, whereas the second coupling arrangement 560 is in the form of a corresponding plurality of female elements 546, that are affixed to and face away from the second end plate 524. While in the illustrated example, each rail segment module 500 is shown as including three male elements 543 and three female elements 546, in at least some alternative variations of this example each rail segment module 500 can include more than three or less than three male elements 543, and correspondingly more than three or less than three female elements 546. In yet other alternative variations of this example, the first coupling arrangement 540 and the second coupling arrangement 560 can include alternative coupling arrangements.

In yet other alternative variations of this example two of the male elements 543 or pins are mounted directly to the respective rail guide support assembly 515, and the third male element 543 or pin is mounted directly to the respective third structural member 510C, at one longitudinal end of each rail segment module 500. Correspondingly, two of the female elements 546 or cups are mounted to the respective rail guide support assembly 515, and the third female element 546 or cup is mounted to the respective third structural member 510C, at the other longitudinal end of each rail segment module 500.

In at least this example, each male element 543 is in the form of a pin, and each female element 546 is in the form of a cup having a recess configured for receiving a respective pin in a load bearing manner.

For example, each respective recess can have an internal profile that is complementary to the external profile of a respective pin, such that when such a pin is received by a respective cup, the two are coupled together tightly.

In implementations of the elevator system 900 in which for example it is intended for the elevator system to remain permanently in place, such an engagement between the pins and cups can be via an interference fit or other friction fit, for example.

In other alternative implementations of the elevator system 900 in which for example it is desired to have the option of dismantling or disassembling the elevator system 900 from the vertical structure VS, the coupling between the pins and respective cups is reversible. For example, the respective coupled pins and cups can be bolted together manually.

Alternatively for example, the respective pins and cups can be configured such that the coupling in a load bearing manner can be automatic, responsive to the respective pins being inserted into and received by the respective cups.

For example, a ball clutch mechanism can be provided in the cups and/or the pins, such that when coupled the respective balls maintain load bearing continuity between the two coupled rail segment modules 500; to decouple, a predetermined threshold tensile force needs to be applied between the coupled rail segment modules 500, and the elevator system can be adapted to provide such a force in an automatic manner during the disassembly process, for example.

In another example, a linear ratchet mechanism can be incorporated in the respective pins and cups, including at least one pawl in one of the pin and cup that operates to slide over a corresponding tooth or wedge element provided in the other one of the pin and cup, when the pin and cup are linearly brought together. However, the pawl locks with the tooth or wedge element when attempting to simply pull apart the pin and cup, and thus to enable decoupling between the pin and cup, the pawl needs to be rotated away from the tooth or wedge element, manually or in an automated manner.

In any case, and referring again to FIGS. 6(*a*) and 6(*b*), the male elements 543 (for example in the form of the aforesaid pins), and the female elements 546 (for example in the form of the aforesaid cups) are located in the respective first end plate 522 and respective end plate 524 of each rail segment module 500, such that when coupled with the corresponding female elements 546 and male elements 543 of adjacent rail segment modules, respectively, the corresponding first, second and third structural members 510A, 510B, 510C of each rail segment module 500 of each pair of thus coupled adjacent modules are each at least aligned, and at least in this case also in at least abutting contact with first, second and third structural members 510A, 510B, 510C of the adjacent rail segment module 500 of the pair.

In at least this example, and referring again to FIG. 2 and FIG. 3, the elevator system 900 optionally further comprises a fire extinguishing system 800, and the rail segment modules 500 and corresponding mast stack 600 are correspondingly configured for enabling water or any other suitable fire extinguishing fluid, to be channeled thereby from one longitudinal end of the mast stack 600 to the other longitudinal end thereof and/or to one or more intermediate locations in the mast stack 600.

In at least this example, and referring in particular to FIG. 3, FIG. 5(*a*) and FIG. 5(*b*), the first structural member 510A and the second structural member 510B comprise a respective first lumen 519A and second lumen 519B, respectively, which are part of the fire extinguishing system 800.

The first lumen 519A extends throughout the longitudinal length of the respective first structural member 510A, and is open at the respective strut upper end 511A and at the respective strut lower end 513A thereof. Furthermore, the respective strut upper end 511A of each said first structural member 510A is configured for sealingly engaging with the respective strut lower end 513A of an upwardly adjacently coupled rail segment module 500, to maintain open fluid communication between the two respective lumens. Similarly, the respective strut lower end 513A of each said first structural member 510A is configured for sealingly engaging with the respective strut upper end 511A of a downwardly adjacently coupled rail segment module 500, to maintain open fluid communication between the two respective lumens.

Similarly, the second lumen 519B extends throughout the longitudinal length of the respective second structural member 510B, and is open at the respective strut upper end 511B and at the respective strut lower end 513B thereof. Furthermore, the respective strut upper end 511B of each said second structural member 510B is configured for sealingly engaging with the respective strut lower end 513B of an upwardly adjacently coupled rail segment module 500, to maintain open fluid communication between the two respective lumens. Similarly, the respective strut lower end 513B of each said second structural member 510B is configured for sealingly engaging with the respective strut upper end 511B of a downwardly adjacently coupled rail segment module 500, to maintain open fluid communication between the two respective lumens.

In this manner, a first continuous channel is provided by the serially engaged first lumens 519A, and a second continuous channel is provided by the serially engaged second lumens 519B.

In at least this example, and referring in particular to FIG. 3, the fire extinguishing system 800 further comprises at least one delivery pipe segment 530, carried by the respective rail guide support assembly 515 of each respective rail segment module 500, and interconnecting the respective first structural member 510A and the respective second structural member 510B thereof. The delivery pipe element 530 comprises an internal lumen, in open fluid communication with the respective first lumen 519A and the respective the second lumen 519B of the respective rail guide support assembly 515. Each delivery pipe segment 530 comprises a port 535, which can be selectively closed or opened, to respectively prevent or allow passage of water or other fluids therethrough from the internal lumen of the respective delivery pipe segment 530.

Thus in at least one mode of operation of the elevator system 900, the first continuous channel and/or the second continuous channel can be connected to a source of pressurized water, for example a fire hydrant, for example via coupling to a respective port 535 (for example corresponding to a rail segment module 500 at a bottom end of the mast stack 600) to allow pressurized water to enter the first continuous channel, the second continuous channel and the delivery pipe elements 530 of the rail segment modules 500 of the mast stack 600. Furthermore, a different one or more of the ports 535 corresponding to one or more selected rail segment modules 500 of the mast stack 600 (for example at the upper end of the mast stack 600) can be opened, to thereby allow pressurized water to be delivered to the vertical structure VS at heights corresponding to the one or more open ports 535. Optionally, a hose pipe can be coupled to a port 535 to thereby enable pressurized water to be delivered via the hose pipe.

In at least an alternative variation of this example, only one of the first structural member 510A and the second structural member 510B comprises a respective first lumen 519A or second lumen 519B, while the other one of the first structural member 510A and the second structural member 510B does not include the respective lumen.

Figure 7:
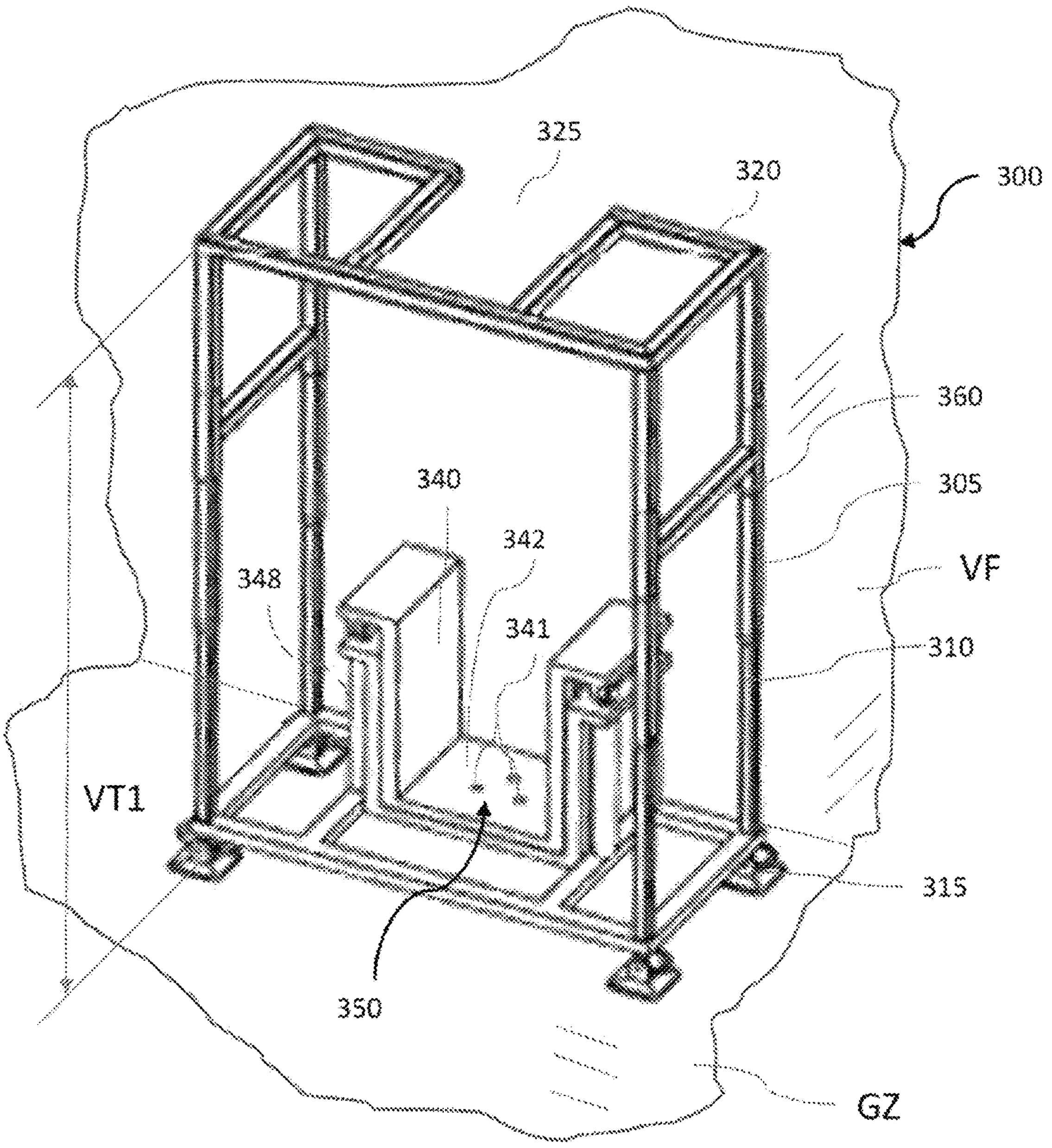
FIG. 7 is a perspective view of an example of a support structure comprised in the kit of the example of FIG. 1.

Referring to FIG. 7, the base structure 300 is configured for being anchored with respect to a ground zone GZ proximal to the vertical face VF, and comprises a module receiving station 350.

The base structure 300 comprises a support frame 305 having an upper pedestal portion 320, supported by a plurality of support legs 310 in vertical spaced relationship with the ground zone GZ. Each leg 310 comprises a foot or pad 315 that is configured for being in overlying contact with the ground zone GZ. The support legs 310 have a vertical dimension VT1, at least in operation of the elevator system 900, that is sufficient such as to enable a rail segment module 500 to be laterally inserted into the module receiving station 350 from an outside of the base structure 300, for example from a suitable rail segment module source, as will become clearer herein. In at least this example, a number of braces 360 can be provided to reinforce the frame structure 300.

While in at least this example, the base structure 300 comprises four support legs 310, in at least some alternative variations of this example the respective base structure can have fewer than four support legs, or more than four support legs, or any other suitable structure that can provide the aforesaid a vertical dimension VT1.

The pads 315 can be configured for anchoring the base structure 300 to the ground zone GZ, for example via bolts or the like. Additionally or alternatively, blocks of concrete or other heavy materials can be overlaid over parts of the base structure 300 to anchor the base structure 300 to the ground zone GZ.

Figure 8A:
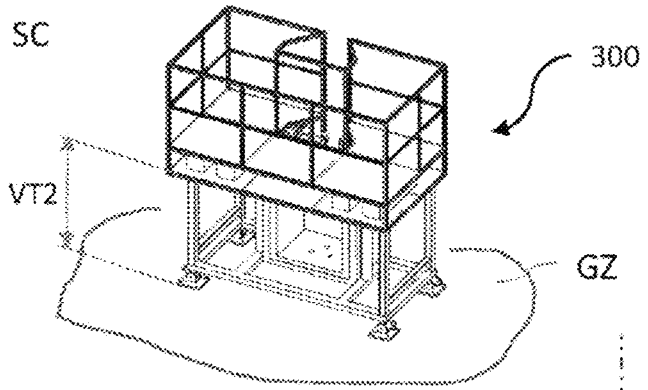
FIG. 8(*a*) is a perspective view of the example of FIG. 7, in compact configuration.
Figure 8B:
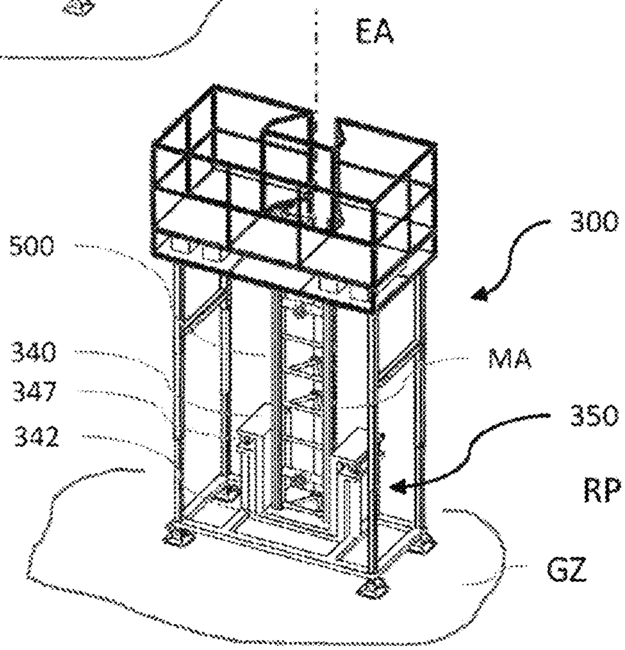
Figure 8C:
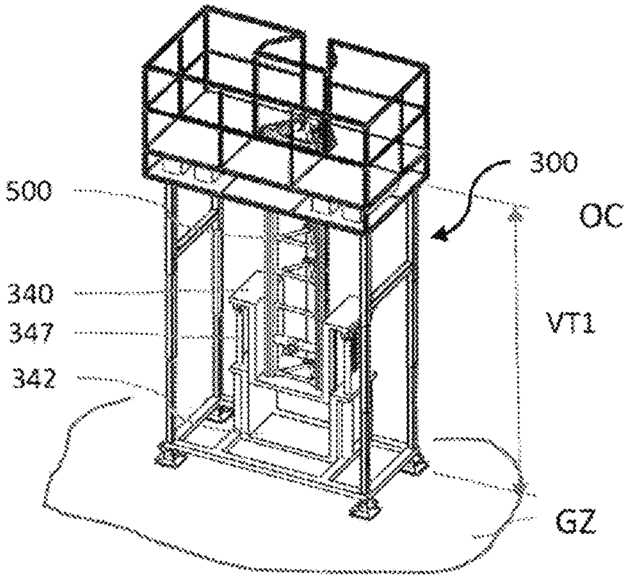

In at least this example, and referring to FIGS. 8(*a*), 8(*b*), 9(*a*) and 9(*b*), the base structure 300 has a deployable configuration, and is thus configured for being deployed between a stowable or compact configuration SC, and an operational configuration OC. This stowability feature can enable less storage space to be required for storing and transporting the base structure 300, for example.

Thus, in at least this example, the support legs 310 are not of fixed geometry, but rather have a telescopic configuration, enabling the support legs to reversibly extend vertically from the stowable configuration SC in which the support legs 310 have vertical dimension VT2, to the operational configuration OC in which the support legs 310 have vertical dimension VT1, larger than vertical dimension VT2.

However, in at least some alternative variations of this example, the respective base structure is configured having a fixed geometry, capable of enabling the rail segment modules to be inserted into the respective module receiving station 350. At least in some cases, this feature can lead to lower manufacturing costs and/or maintenance costs, as compared with a corresponding deployable configuration, for example.

The upper pedestal portion 320 is configured for supporting the elevator platform 200 at least during assembly of the elevator system 900.

Referring again to FIG. 7, the upper pedestal portion 320 further comprises a window 325 sized and shaped for enabling a rail segment module 500 that is residing in the module receiving station 350 to be fed through the window 325 and into the rail segment stacking system 400. For example, the window 325 has a shape enveloping or generally similar to, and dimensions essentially just larger than, the shape and dimensions of a cross-section of the rail segment module 500. In at least this example, the window 325, and indeed the base structure 300, is open on a lateral side thereof, in operation facing the vertical face VF. This enables the base structure 300 to be laterally removed from the anchored position once the elevator system 900 is assembled and engaged to the vertical face VF. This allows the base structure 300 to be used for assembling another elevator platform at another location. In alternative variations of this example, the base structure 300 can be configured for remaining on site so long as it is desired to use the elevator system 900, and in such cases the window 325, and indeed the base structure 300, is not required to be open on a lateral side thereof.

Referring again to FIGS. 7, 8(*a*), 8(*b*), 8(*c*), the module receiving station 350 is configured for selectively receiving each rail segment module 500 in turn from a rail segment module source, and for feeding in turn each received rail segment module 500 to the rail segment stacking system 400.

The module receiving station 350 thus comprises a lift trolley 340 having a trolley base 342 reciprocably movably mounted with respect to the support frame 305 via a powered lifting system 348.

The trolley base 342 is configured for receiving and supporting each rail segment module 500 in turn, in a stackable orientation, i.e., in which the respective module axis MA is parallel and aligned with the elevator axis EA. For example, the trolley base 342 can include a flat surface having wells 341 corresponding in number and disposition to the second coupling arrangement 560, and being complementarily shaped thereto, such that the second coupling arrangement 560 can be temporarily engaged in the wells 341 while the respective rail segment module 500 is held in place by the trolley base 342.

The powered lifting system can include for example a plurality of jacks 347, each anchored at one end thereof to the support frame 305 and having a movable piston element at the other end thereof mounted to the trolley base 342. Referring in particular to FIGS. 8(*b*), 8(*c*), 9(*b*) and 9(*c*), the jacks 347 are configured for selectively urging the trolley base 342 in an upward direction to a feeding position FP, or in a return downward direction to a module receiving position RP, defining a lift stroke LS, responsive to actuation of the jacks 347. For example, the jacks 347 can be pneumatic jacks, hydraulic jacks, electrically actuated jacks, and so on.

The vertical dimension of the lift trolley 340 in the module receiving position RP can be just less than vertical dimension VT1.

Figure 10:
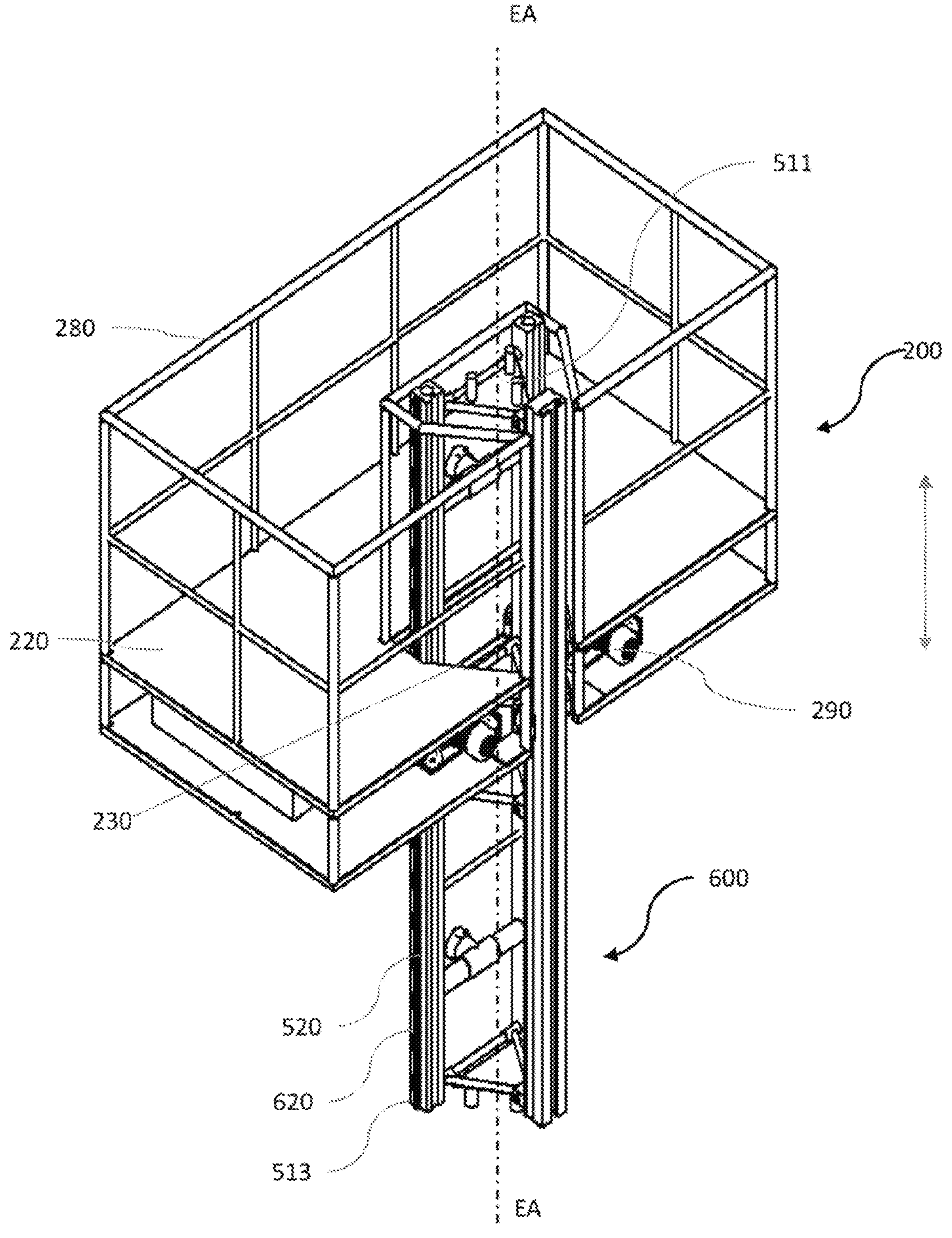
FIG. 10 is a perspective view of an example of an elevator platform comprised in the kit of the example of FIG. 1.

Referring also to FIG. 10, the elevator platform 200 is configured for being selectively transported along the mast stack 600 parallel to the elevator transport axis EA via the at least one contiguous vertical elevator rail 620, in operation of the elevator system 900, as will become clearer herein.

The elevator platform 200 is also configured at least for receiving a payload (for example, at one end of the elevator axis EA), for carrying the payload while being transported along the mast stack 600, and for delivering the payload at another location along the elevator axis (for example at the other end of the elevator axis EA).

The elevator platform 200 thus includes a payload zone 220 configured for holding or accommodating the payload thereat during operation of the elevator system 900.

The elevator platform also comprises a platform window 230 sized and shaped for enabling the elevator platform 200 to engage with and be transported with respect to the mast stack 600 in operation of the elevator system 900. For example, the platform window 230 has a shape enveloping or similar to, and dimensions essentially just larger than, the shape and dimensions of a longitudinal cross-section of the rail segment module 500.

In at least this example, the platform window 230 overlies the support structure window 325 when the elevator platform 200 is sitting on the upper pedestal portion 320.

In at least this example, the elevator platform 200 further comprises one or more drive units 290 configured for providing the motive force required for transporting the elevator platform 200 with respect to the mast stack 600 along the elevator axis EA. For example, the drive units 290 comprise one or more electrical motors, operatively coupled to an electrical power source (not shown). For example, such an electrical power source can be in the form of batteries carried on-board the elevator platform 200. Alternatively, the electrical power source can be a generator carried on a mobile unit such as a truck, and suitable cables connect the elevator platform 200 to the electrical power source.

In at least this example, the drive units 290 are accommodated in the elevator platform 200.

The shape, size and form of the elevator platform 200 can be designed to match a particular type of payload, for example for predetermined types of elevator operation, or can be one chosen from a variety of standard sizes/shapes/forms, for example each capable of being used for a variety of different elevator operations.

In the illustrated example, the elevator platform 200 is configured for carrying passengers and/or goods, and includes a peripheral guard rail 280.

The elevator platform 200 can be configured for being operated manually, for example by a passenger while on the elevator platform 200. Additionally or alternatively, the elevator platform 200 can be configured for being operated by remote control, for example by an operator on the ground. Such remote control can be via wireless communication between a controller operated by the operator, and a receiver unit mounted to the elevator platform 200 and coupled to the drive units 290, for example. Alternatively, such remote control can be via suitable wires between a controller operated by the operator, and a receiver unit mounted to the elevator platform 200 and coupled to the drive units 290, for example.

Figure 11:
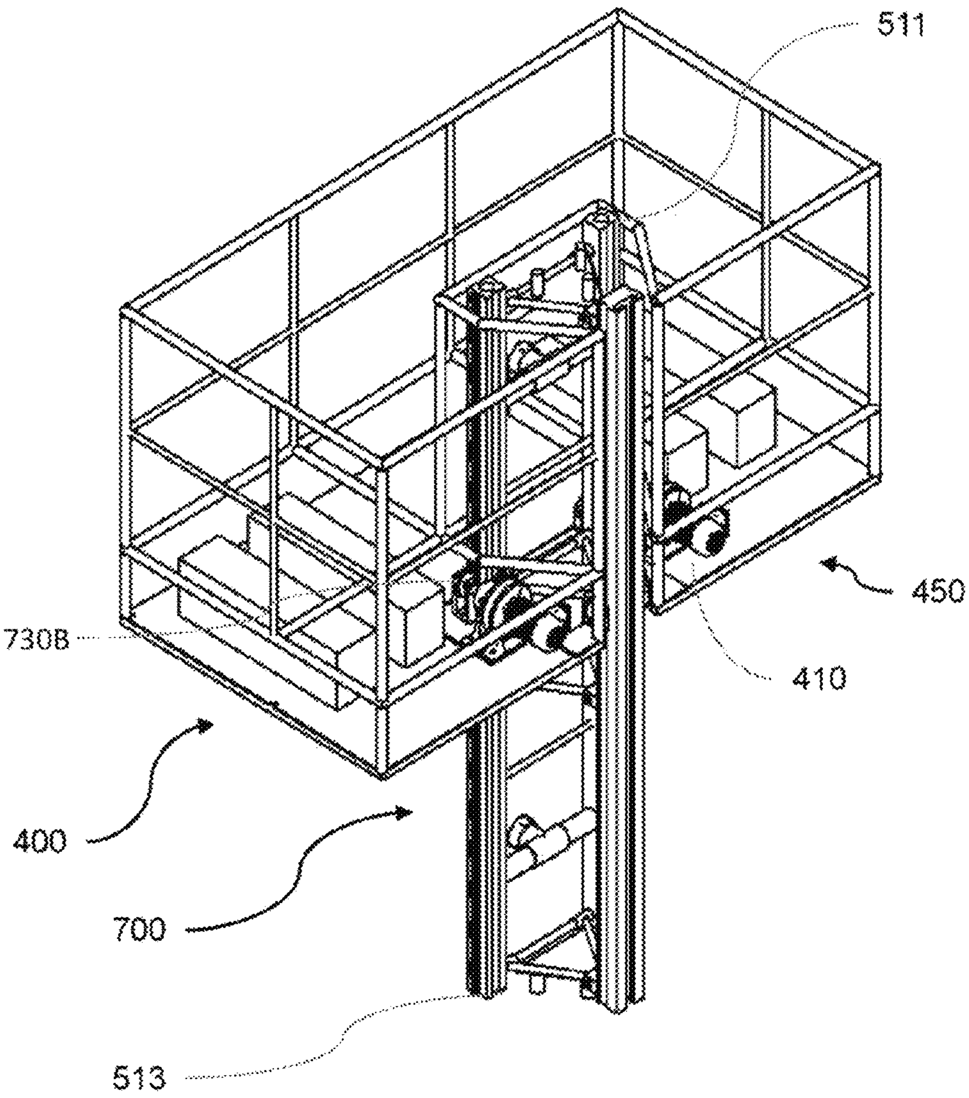
FIG. 11 is a perspective view of an example of a rail segment stacking system comprised in the kit of the example of FIG. 1.
Figure 11A:
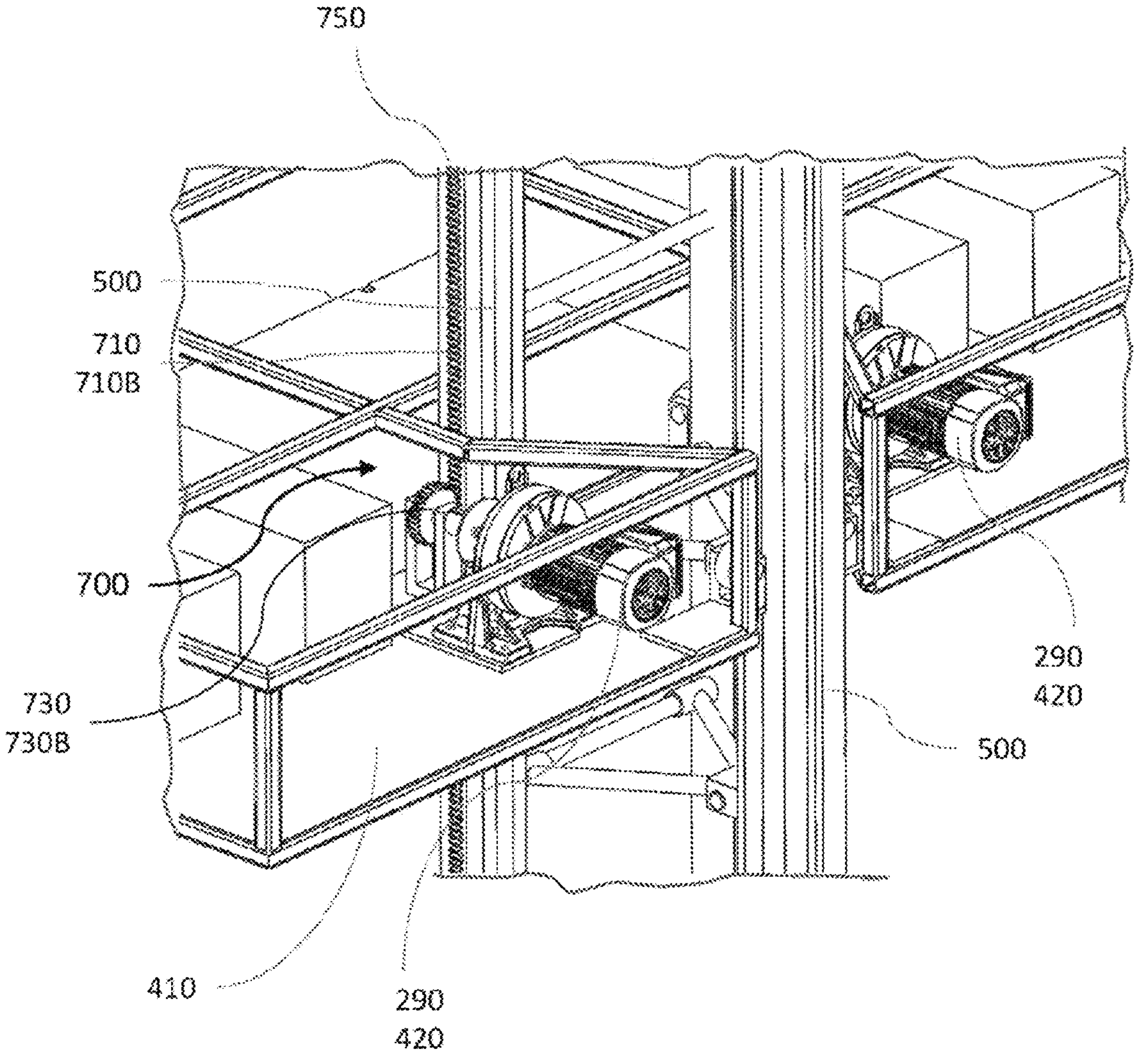

Referring to FIGS. 11, 11(*a*), 12, 13, the rail segment stacking system 400 is configured for on-site coupling and bottom-to-top stacking of the rail segment modules 500 that are fed to the rail segment stacking system 400 from the module receiving station 350, to thereby provide the progressively elongating mast stack 600. The rail segment stacking system 400 is also configured for selectively transporting the progressively elongating mast stack 600 upwardly and progressively further away from the rail segment stacking system 400, and thus from the ground zone GZ, after each rail segment module 500 is coupled and stacked to the then-current mast stack 600 in the aforesaid bottom-to-top stacking.

As will become clearer herein, the rail segment stacking system 400 is configured for:

- transporting a first said rail segment module 500 upwardly away from the module receiving station 350 thereby enabling the next rail segment module 500 to be laterally received by the module receiving station 500, for example from a rail segment module source;
- enabling successive rail segment modules 500 fed to the rail segment stacking system 400 from the module receiving station 350 to be coupled in turn to the currently last-transported rail segment module 500, to thereby sequentially stack in a bottom-to-top direction successive rail segment modules 500 individually fed from the module receiving station 350, to form the progressively elongating mast stack 600, the mast stack 600 having a progressively increasing vertical dimension correlated to the number of rail segment modules 500 stacked in the mast stack 600, and
- transporting the mast stack 600 including the just-coupled rail segment module 500 upwardly away from the module receiving station 350 thereby enabling a further rail segment module 500 to be received by the module receiving station 350.

The rail segment stacking system 400 comprises a frame support 410 configured for enabling each rail segment module 500 to be fed therethrough from the module receiving station 350, and a drive system 450 configured for supporting and progressively transporting the progressively elongating mast stack 600 through the frame support 410 in operation of the elevator system 900, in particular during assembly of the elevator system 900 from the kit 100.

In at least this example, the drive system 450 comprises a rack and pinion arrangement 700 in cooperation with the rail segment modules 500. The drive system 450 comprises a motor drive system 420 coupled to the rack and pinion arrangement 700. As will become clearer herein, in at least this example, the motor drive system 420 is the same as the drive units 290, i.e., they are one and the same component, and the motor drive system 420 also operates as the drive units 290. However, in alternative variations of this example, the motor drive system 420 are distinct components with respect to the drive units 290.

The rack and pinion arrangement 700 comprises a first plurality of rack elements 710 and a second plurality of pinions 730, coupled with one another such that during assembly of the elevator system 900 from the kit 100, a rotational movement of respective pinions 730 results in a linear translation of respective rack elements 710.

In at least this example, the rack elements 710 are provided in the rail segment modules 500, and the pinions 730 are provided in the frame support 410. The pinions 730 are rotatably mounted with respect to the frame support 410, and operatively coupled to the motor drive system 420. However, in at least some alternative variations of this example, the respective rack and pinion arrangement can instead comprise a first plurality of rack elements provided in the frame support, and a second plurality of pinions provided in the rail segment modules.

While in at least this example each rail segment module 500 comprises a pair of rack element 710, in alternative variations of this example, each respective rail segment module can comprise one, or more than two respective rack elements.

Figure 12:
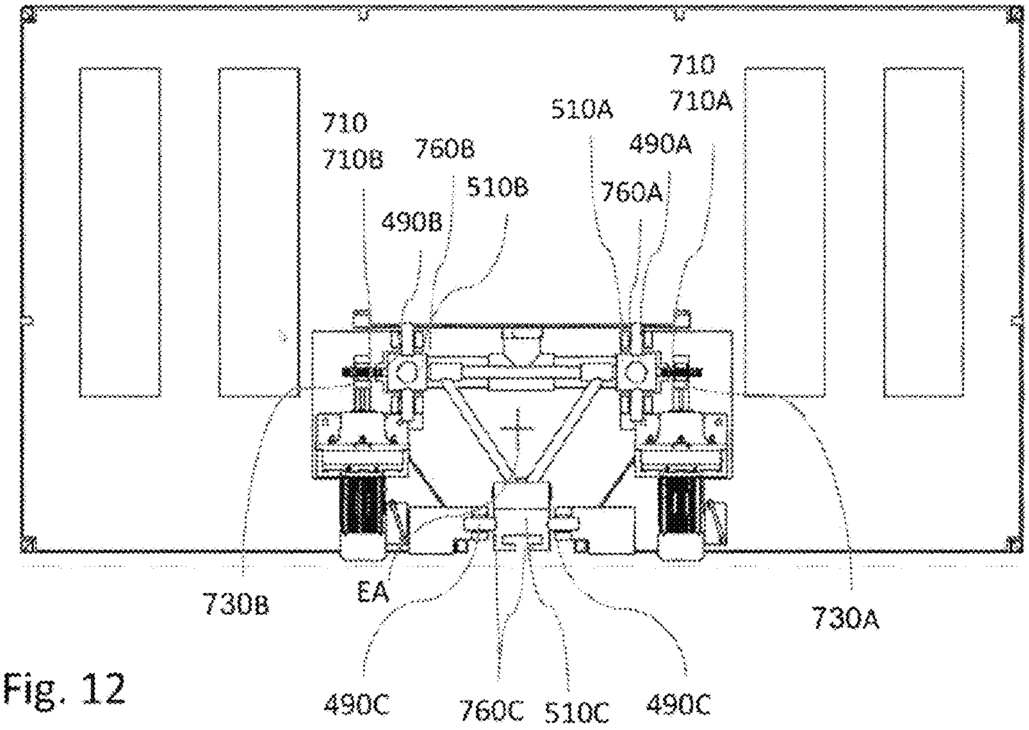
FIG. 12 is a top view of the example of FIG. 11.
Figure 13:
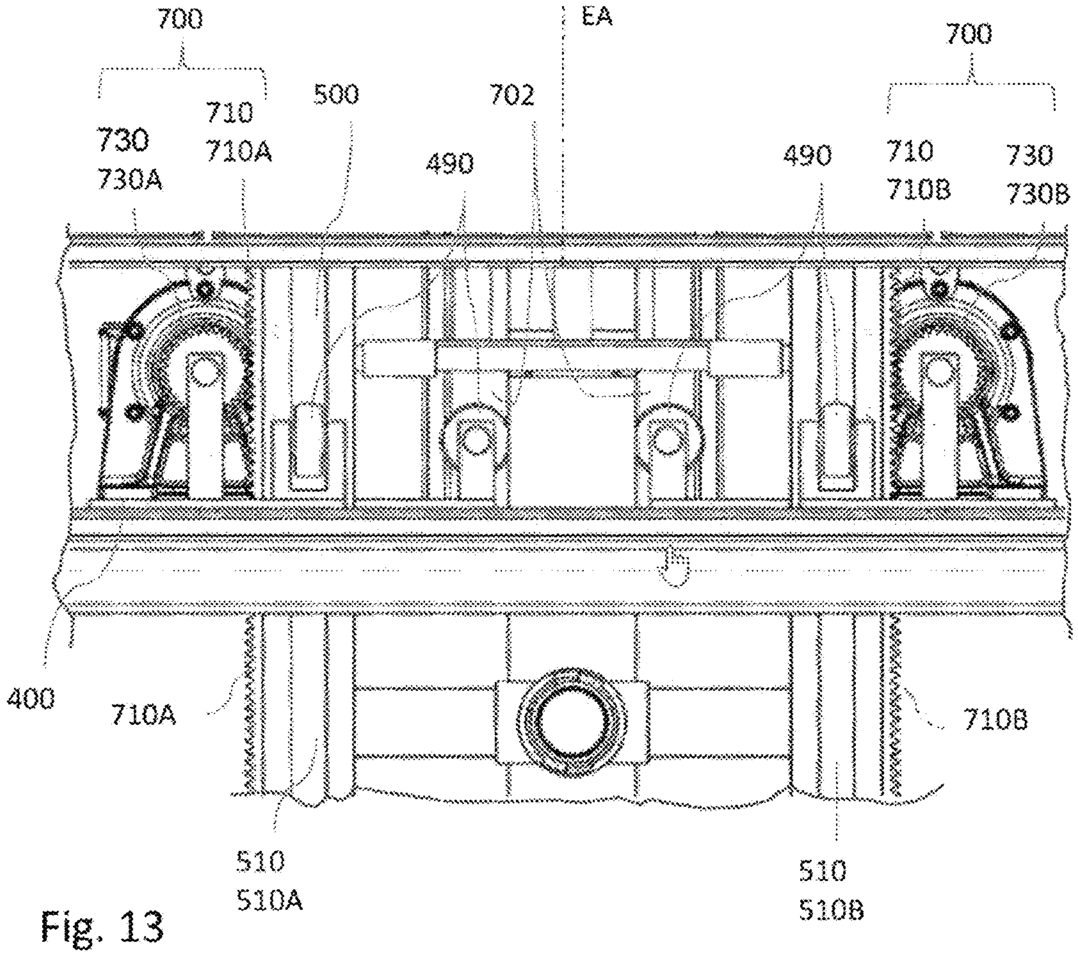
FIG. 13 is a front partial view of the example of FIG. 11.

Referring in particular to FIG. 12 and FIG. 13, for each rail segment module 500, a respective first rack element 710, also designated with reference numeral 710A, is affixed to the first structural member 510A, and a respective second rack element 710, also designated with reference numeral 710B, is affixed to the second structural member 510B, the rack elements 710 being parallel to one another and parallel to the elevator axis EA.

Referring also to FIG. 3, each rack element 710A, 710B extends longitudinally along the longitudinal length of the respective first structural member 510A or second structural member 510B (i.e., along the effective longitudinal module dimension LS), such that the ends 711, 713 of each rack element 710 are at the respective ends 511, 513, respectively, of the respective rail segment module 500. In at least this example, the rack elements 710A, 710B, in particular the teeth thereof, are facing mutually opposed transverse directions for each respective rail segment module 500.

Referring also to FIG. 2, the rack elements 710 are positioned with respect to the rail segment modules 500 in a manner such that when the rail segment modules 500 are coupled and stacked in the mast stack 600, the respective rack elements 710 corresponding to each said pinion 730 are mutually aligned to provide a corresponding contiguous rack member 750. Thus in at least this example the mast stack 600 comprises a first contiguous rack member 750, also designated with reference numeral 750A and a second contiguous rack member 750, also designated with reference numeral 750B. The first contiguous rack member 750A is formed by the adjacent respective first rack elements 710A of the stacked rail segment modules 500, and the second contiguous rack member 750B is formed by the adjacent respective second rack elements 710B of the stacked rail segment modules 500.

Referring for example to FIG. 13, for each rail segment module 500, each of the rack elements 710 thereof is associated with, and corresponds to, at least one pinion 730. Thus, in at least this example, the rack and pinion arrangement 700 comprises at least one first pinion 730A associated with all of the respective first rack elements 710A of the rail segment modules 500, and at least one second pinion 730B associated with all of the respective second rack elements 710B of the rail segment modules 500.

In other words, in at least this example, the rack and pinion arrangement 700 comprises at least one first pinion 730A associated with first contiguous rack member 750A, and at least one second pinion 730B associated with second contiguous rack member 750B.

In at least this example, the rack and pinion arrangement 700 comprises one first pinion 730A and one second pinion 730B, each being rotatably mounted to the frame support 410 about respective rotation axes parallel to the lateral direction. As best seen in FIG. 12, the first pinion 730A and the second pinion 730B are transversely spaced from one another such that when a rail segment module 500 is fed to the rail segment stacking system 400 from the module receiving station 350, the first pinion 730A is coupled with the respective first rack element 710A, and concurrently the second pinion 730B is coupled with the respective second rack element 710B. This arrangement enables the mast stack 600 to be translated in a linear direction parallel to the elevator axis EA responsive to the pinions 730 being turned by the motor drive system 420.

Figure 9A:
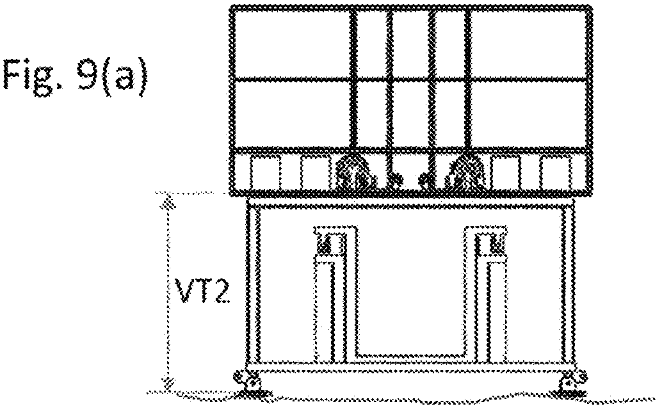
FIG. 9(*a*) is a front view of the example of FIG. 7, in compact configuration.
Figure 9B:
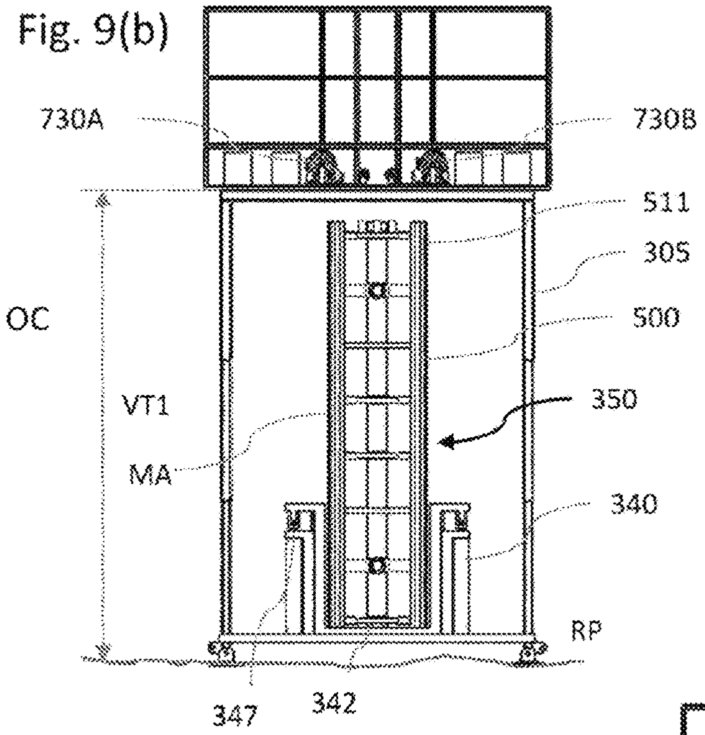
Figure 9C:
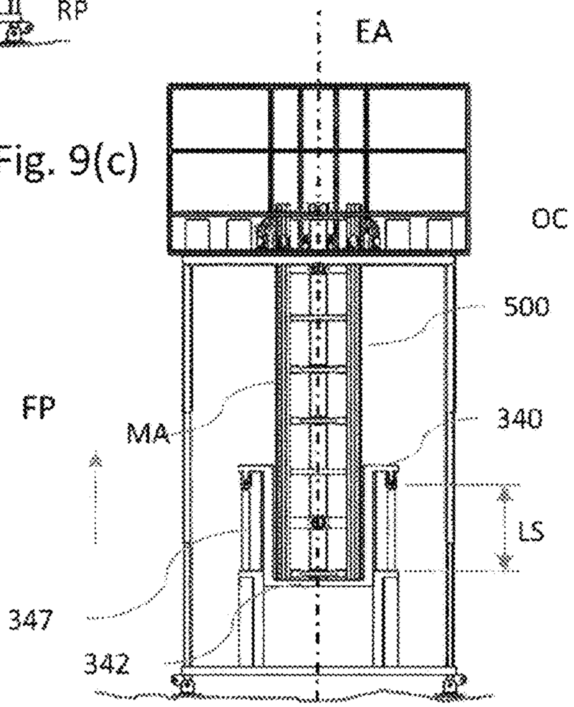

Furthermore, and referring again to FIG. 9(*b*) and FIG. 9(*c*), the first pinion 730A and the second pinion 730B are longitudinally positioned with respect to the base structure 300 above the module receiving station 350, such that when a rail segment module 500 is received into the module receiving station 350, and the lift trolley 340 is in the module receiving position RP, the upper end 511 of the received rail segment module 500 is not initially coupled with the first pinion 730A and the second pinion 730B. Referring also to FIG. 11, this enables the bottom end of the previously-fed rail segment module 500 to be projecting downwards towards the module receiving station 350, and for the previously-fed rail segment module 500 to be still in coupled engagement with the first pinion 730A and the second pinion 730B. This arrangement further enables the rail segment module 500 currently residing in the module receiving station 350 to be translated to the feeding position FP concurrently coupling with the previously-fed rail segment module 500 (and thus concurrently coupling with the current mast stack 600) in a bottom-to-top stacking manner, and subsequently displacing the updated mast stack 600 in an upwards direction such that the just-fed rail segment module 500 is coupled to the first pinion 730A and the second pinion 730B via the respective first rack element 710A and the respective second rack element 710B of the just-fed rail segment module 500.

Referring in particular to FIG. 5(*b*), FIG. 12 and FIG. 13, the rail segment modules 500 each comprises a respective one or more guide rail elements 762, configured to be mutually aligned to form corresponding one or more contiguous guide rails 760 when the rail segment modules 500 are serially stacked contiguously with respect to one another in the progressively elongating mast stack 600. Correspondingly, the rail segment stacking system 400 comprises a plurality of alignment rollers 490 configured for cooperating with the contiguous guide rails 760 to maintain the rail segment modules 500, and thus the mast stack 600, aligned with respect to the rail segment stacking system 400.

In at least the illustrated example, one or more sets of alignment rollers 490 and corresponding contiguous guide rails 760 provide alignment in a transverse direction. Referring to FIG. 12, two such continuous guide rails 760, also designated with reference numeral 760C, are provided on opposite transverse sides of the third structural member 510C of the rail segment modules 500 in the mast stack 600, and cooperate with transverse alignment rollers 490C. Similarly, two such continuous guide rails 760, also designated with reference numeral 760A, are provided on opposite transverse sides of the first structural members 510A of the rail segment modules 500 in the mast stack 600, and cooperate with lateral alignment rollers 490A; additionally, two such continuous guide rails 760, also designated with reference numeral 760B, are provided on opposite transverse sides of the second structural members 510B of the rail segment modules 500 in the mast stack 600, and cooperate with lateral alignment rollers 490B.

In at least this example, the rail segment stacking system 400 is integrated with the elevator platform 200. In such an arrangement, the elevator platform 200 essentially carries out two functions—an assembly function and an elevator function.

In the assembly function, the platform 200, in particular the rail segment stacking system 400 that is integrated into the platform 200, is locked with respect to the base structure 300, and is immobilized thereby. For this purpose, the kit 100, in particular the platform 200 and/or the base structure 300 comprises a locking arrangement (not shown) for selectively locking and unlocking the elevator platform 200 with respect to the base structure 300. In the respective locked configuration, the rail segment stacking system 400 can be operated according to the assembly function, for stacking and transporting the rail segment modules 500 to provide the progressively extending mast stack 600. In the respective unlocked configuration, the rail segment stacking system 400 can be operated according to the elevator function, selectively causing the elevator platform 200 to be selectively transported along the fully assembled mast stack 600 via the contiguous vertical elevator rails 620, in operation of the elevator system 900.

Thus, in at least this example, each contiguous vertical elevator rail 620 of the elevator system 900 is provided by, i.e., is constituted by, the corresponding first contiguous rack member 750A and the second contiguous rack member 750B, and thus the corresponding rack elements 710 of the rail segment modules 500 are provided by, i.e. are constituted by, the respective elevator rail elements 520.

In at least this example, the motor drive system 420 provides the motive power for translating the elevator platform 200 along the elevator axis EA, and the elevator platform 200 moves along the elevator axis EA responsive to the motor drive system 420 turning the pinions 730A, 730B with respect to the first contiguous rack member 750A and the second contiguous rack member 750B, respectively, i.e., with respect to the respective contiguous vertical elevator rails 620. Similarly, the contiguous guide rails 760 and associated rollers maintain the elevator platform 200 aligned with mast stack 600.

It is to be noted that in at least some alternative variations of this example, the rail segment stacking system 400 is not integrated with the elevator platform 200, and the rail segment stacking system 400 is independent from the elevator platform 200, structurally and/or operationally. In such an arrangement, rail segment stacking system 400 can be permanently fixedly mounted to the base structure 300, for example, and carries out the assembly function independent of the elevator platform 200, while the elevator platform 200 carries out the elevator function. In such a case, and during assembly function, the respective platform 200 can be resting over the base structure 300, and the rail segment stacking system 400 can be operated according to the assembly function, for stacking and transporting the rail segment modules 500 to provide the progressively extending mast stack 600. Once the assembly function is completed, the elevator platform 200 can be engaged with the contiguous elevator rails 620, and can be operated according to the elevator function, enabling causing the elevator platform 200 to be selectively transported along the fully assembled mast stack 600 via the at least one contiguous elevator rail 620, in operation of the elevator system 900. In such a case, the elevator platform 200 can carry its own motor system and pinions that can engage with the respective contiguous rack member 750 which thus constitute the contiguous vertical elevator rail 620 of the elevator system 900. Alternatively, the rail segment modules 500 can be configured, together with the elevator platform 200 with an elevator rack and pinion system, or any other suitable transport system, to enable the elevator to be transported over the rail segment modules 500 when stacked in the mast stack 600. Similarly, an independent alignment system can be provided for maintaining aligned the elevator platform 200 with respect to the mast stack 600 while being operated under elevator function.

Thus, in at least some such examples in which the rail segment stacking system 400 is not integrated with the elevator platform 200, the elevator function can be performed using a cable system (not shown) rather than the rack and pinion arrangement 700.

For example, such a cable system can include one or more cables that are anchored at one end thereof to the platform 200 and coupled at the other end of to drive units 290, and configured such that as the drive units 290 are operated to turn in one direction or the other, the elevator platform 200 is correspondingly raised or lowered along the mast stack 600. For example, the drive units 290 can be anchored to the mast stack 600, for example at the top thereof, or at the bottom thereof (in which case the one or more cables are looped around one or more pulleys at the top end of the mast stack 600). Alternatively, the drive units 290 can be anchored to the base structure 300, and the one or more cables are looped around one or more pulleys at the top end of the mast stack 600.

Alternatively, for example, such a cable system can include one or more cables that are coupled at one end thereof to drive units 290 that are accommodated in the platform 200, and are coupled at the other end thereof to the mast stack 600 or the base structure 300, and the cable system is configured such that as the drive units 290 are operated to turn in one direction or the other, the elevator platform 200 is correspondingly raised or lowered along the mast stack 600. For example, the other end of the one or more cables can be anchored to the mast stack 600, for example at the top thereof, or at the bottom thereof (in which case the one or more cables are looped around one or more pulleys at the top end of the mast stack 600). Alternatively, the aforesaid other end of the one or more cables can be anchored to the base structure 300, and the one or more cables are looped around one or more pulleys at the top end of the mast stack 600 and down to the drive units 290.

While in at least this example, the drive system 450 comprises a rack and pinion arrangement 700 in cooperation with the rail segment modules 500, in at least some other alternative variations of this example, other mechanical arrangements can be provided for the drive system to enable each rail segment module 500 to be fed through the rail segment stacking system 400 from the module receiving station 350, and for supporting and progressively transporting the progressively elongating mast stack 600 through the frame support 410 in operation of the elevator system 900, in particular during assembly of the elevator system 900 from the kit 100. For example, suitable drive systems based on chain and sprocket arrangements, or based on cables and pulleys can also be used.

Figure 14:
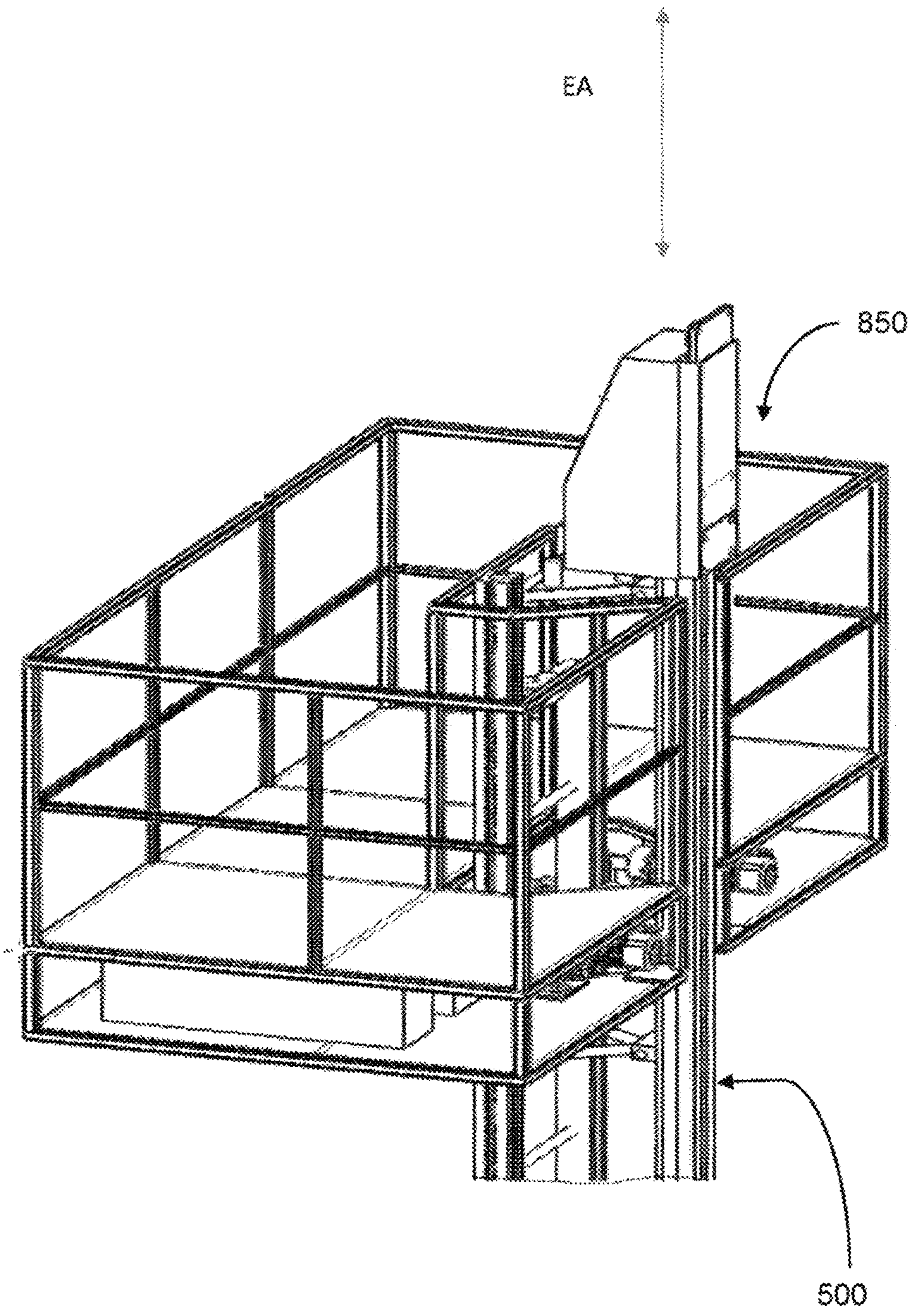
FIG. 14 is a perspective view of an example of a dispenser module optionally comprised in the kit of the example of FIG. 1, in engaged relationship with a rail segment module.
Figure 15:
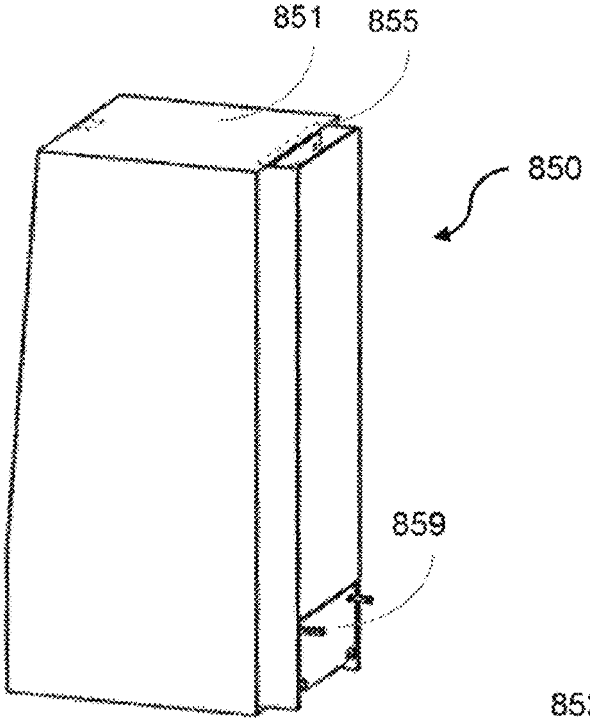
FIG. 15 is a back perspective view of the dispenser module example of FIG. 14.
Figure 18:
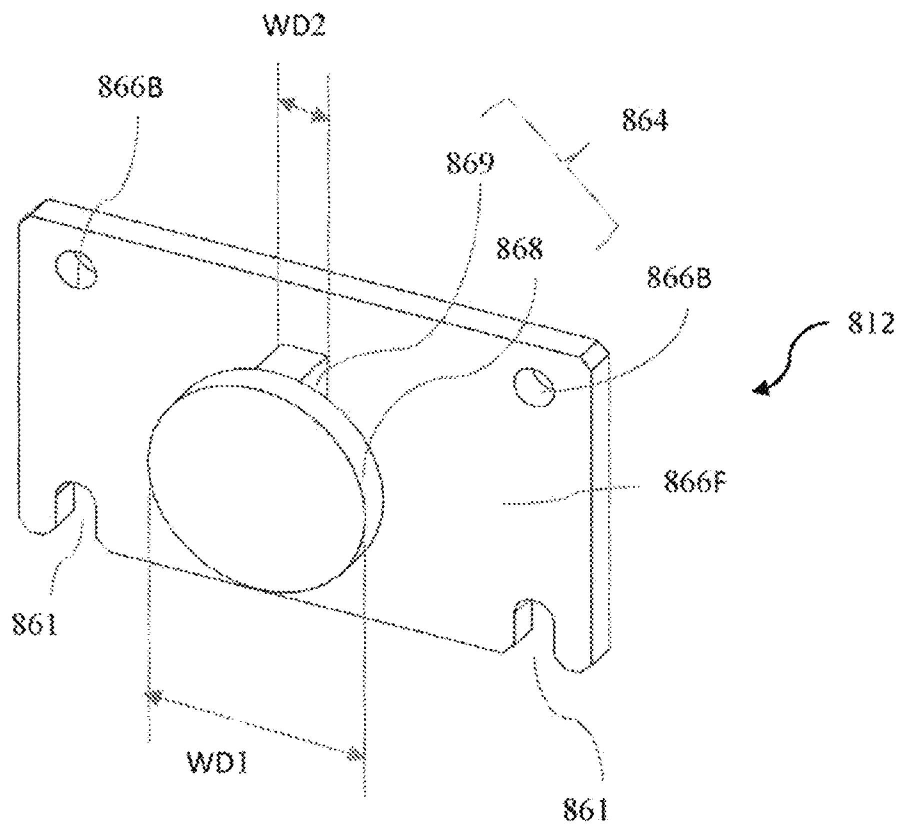
FIG. 18 is a perspective view of an example of a lateral load bearing element configured for being dispensed by the dispenser module example of FIG. 14.

In at least this example, and referring in particular to FIGS. 14, 15, 18, in at least this example, the kit 100 further comprises a dispenser module 850 configured for serially dispensing each one of a plurality of lateral load bearing elements 812 into engaging relationship with respect to the vertical face VF. In particular, the dispenser module 850 is configured for selectively engaging the lateral load bearing elements 812 with respect to the vertical face VF, in a sequential manner, concurrent with the mast stack 600 being assembled and advanced in an upward direction via the elevator rail assembly structure 400. However, and as will become clearer herein, in at least some alternative variations of this example, the respective kit can omit the dispenser module.

In at least this example, the dispenser module 850 is configured for being carried by a thereby modified rail segment module 500. In at least this example, the dispenser module 850 is carried by the first, or uppermost rail segment module 500 in the mast stack 600, and thus the dispenser module 850 can operate to dispense and engage the lateral load bearing elements 812 in advance of the actual mast stack 600.

Referring in particular to FIG. 18, each lateral load bearing element 812 comprises a load bearing end 864 and an engaging end 862. The load bearing end 864 is configured for projecting laterally from the vertical face VF when the respective lateral load bearing element 812 is engaged with respect to the vertical face VF. The engaging end 862 is configured for being selectively engaged with respect to the vertical face VF when dispensed via the dispenser module 850.

As will become clearer herein, the engaging end 862 is configured for enabling the lateral load bearing element 812 to be fixedly engaged with the vertical face VF, and the load bearing end 864 is configured for enabling the lateral load bearing element 812 to be slidably engaged with respect to the mast stack 600.

In at least this example, the load bearing end 864 comprises an enlarged head portion 868 connected to a load bearing panel 866F via a neck portion 869. The head portion 868 has a first width dimension WD1, and the neck portion 869 has a second width dimension WD2 significantly smaller than the first width dimension WD1. For example, a ratio of the first width dimension WD1 to the second width dimension WD2 can be any one of: 1.5, 2, 3, 4, 5 or greater than 5.

Referring again to FIG. 3 and FIG. 5(*b*), each rail segment module 500 comprises at least one lateral load bearing rail element 810 configured for cooperating with the lateral load bearing elements 812, in particular during assembly of the elevator system 900 from the kit 100, and after such assembly.

In particular, each lateral load bearing rail element 810 is configured such that when the rail segment modules 500 are coupled and serially stacked in the mast stack 600, the respective lateral load bearing rail elements 810 are mutually aligned to provide a corresponding contiguous lateral load bearing rail member 870. In at least some alternative variations of this example, the respective contiguous lateral load bearing elements of the respective mast stack can be mutually aligned to provide a plurality of respective contiguous lateral load bearing rail members.

In any case, in at least this example, the contiguous lateral load bearing rail member 870 is configured for enabling sliding engagement with the load bearing ends 864 of the plurality of lateral load bearing elements 812 in a manner allowing relative translation between the respective contiguous lateral load bearing rail member 870 and the load bearing ends 864 in a first degree of freedom, while preventing free relative movement between the contiguous lateral load bearing rail member 870 and the load bearing ends 864 in a second degree of freedom or in a third degree of freedom. The first degree of freedom is parallel to the elevator transport axis EA; the second degree of freedom is orthogonal to the first degree of freedom and is in the lateral direction LD; the third degree of freedom is orthogonal to the first degree of freedom and is in the transverse direction TD.

In at least this example, the lateral load bearing rail elements 810 are provided in the respective third structural member 510C of each respective rail segment module 500.

While in at least this example each rail segment module 500 comprises a single lateral load bearing rail element 810, in alternative variations of this example, each respective rail segment module can comprise two, or more than two respective lateral load bearing rail elements.

For each rail segment module 500, the respective lateral load bearing rail element 810 is affixed to the third structural member 510C, the lateral load bearing rail elements 810 being parallel to the elevator axis EA.

Each lateral load bearing rail element 810 has a C-shaped cross-section, as best seen in FIG. 5(*b*), defining a lateral opening 815 between two arms 816 of the "C". The opening 815 has a second transverse width dimension WD2', and leads into a channel 820 having a first transverse width dimension WD1' greater than second transverse width dimension WD2'.

For each rail segment module 500, the respective lateral load bearing rail element 810 extends longitudinally along the longitudinal length of the respective third structural member 510C (i.e., along the effective longitudinal module dimension LS), such that the ends 811, 813 of each lateral load bearing rail element 810 is at the respective ends 511, 513, respectively, of the respective rail segment module 500. In at least this example each lateral load bearing rail element 810 is facing mutually opposed lateral direction with respect to the first structural member 510A or the second structural member 510B for each respective rail segment module 500.

The channel 820 and the opening 815 are each co-extensive with the respective third structural member 510C, and are open at respective opposed longitudinal ends thereof.

The second transverse width dimension WD2' is greater than the second width dimension WD2 but less than the first width dimension WD1 of the respective load bearing end 864. The first transverse width dimension WD1' is greater than the first width dimension WD1. In this manner, the respective lateral load bearing rail elements 810 can slide with respect to the respective lateral load bearing elements 812 while the respective load bearing end 864 are engaged with respect to the channels 820. Such engagement allows relative movement between the respective lateral load bearing rail elements 810 (and thus the respective rail segment modules 500, and thus the mast stack 600), and the lateral load bearing elements 812 in a longitudinal direction parallel to the elevator axis AE, but prevents any significant relative movement in either the lateral direction LD or the transverse direction TD, i.e., any such relative movement other than related to the clearance between the respective lateral load bearing rail elements 810 and the respective load bearing end 864.

Referring also to FIG. 2, the respective lateral load bearing rail elements 810 are positioned with respect to the rail segment modules 500 in a manner such that when the rail segment modules 500 are coupled and stacked in the mast stack 600, the respective lateral load bearing rail elements 810 are mutually aligned to provide a corresponding contiguous lateral load bearing rail member 870. Thus in at least this example the mast stack 600 comprises a corresponding single contiguous lateral load bearing rail member 870. In at least some alternative variations of this example, the mast stack 600 can comprise a plurality of contiguous lateral load bearing rail members, typically parallel to one another and parallel to the elevator axis EA.

Figure 16:
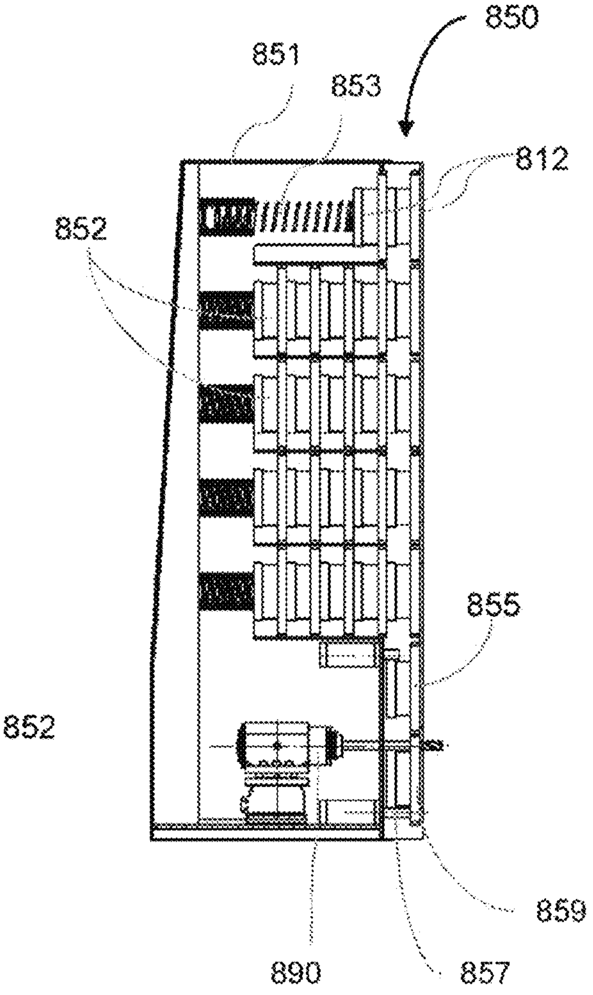
FIG. 16 is a side cross-sectional view of the dispenser module example of FIG. 14.
Figure 17:
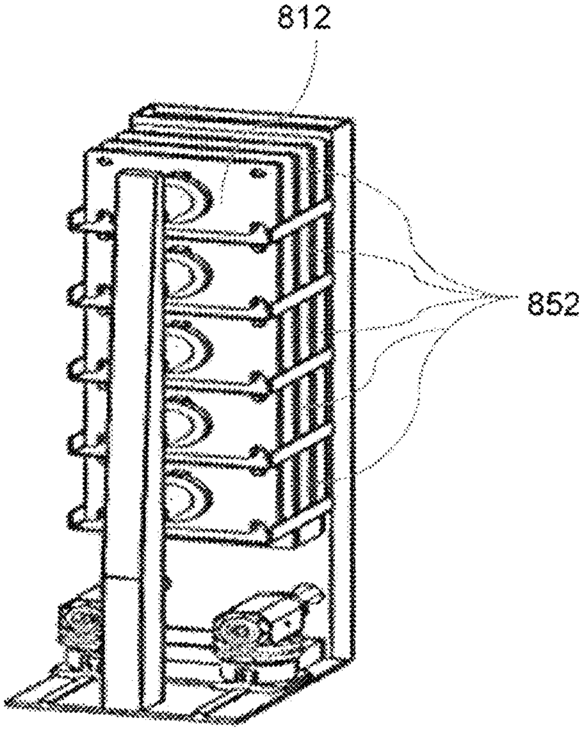
FIG. 17 is a front perspective view of the dispenser module example of FIG. 14, in which the housing has been removed.

Referring again to FIGS. 15, 16, 17, the dispenser module 850 comprises one or more dispenser magazines 852, accommodated in a dispenser housing 851. Each dispenser magazine 852 is configured for accommodating a plurality of lateral load bearing elements 812, in the form of a respective stack arrangement, and comprises a biasing member 853, for example a spring, that urges a stack of lateral load bearing elements 812 towards a dispenser channel 855 provided at the front of the housing 851. The dispenser channel 855 is configured for enabling each of the lateral load bearing elements 812 in the dispenser channel 855 to gravitate to a dispensing station 859 at the lower part of the dispenser channel 855 such that so long as there are lateral load bearing elements 812 in the dispenser module 850, one lateral load bearing elements 812 will always be located at the dispensing station 859.

The dispensing station 859 is configured for holding each lateral load bearing elements 812 in turn, and for enabling each such lateral load bearing elements 812 to be dispensed in a lateral direction LD towards the vertical face VF, during assembly of the elevator platform 900. For example, the dispensing station 859 in at least this example comprises a pair of mechanical stops 857 onto which each lateral load bearing element 812 rests via complementary open slots 861 (FIG. 18), while residing at the dispensing station 859.

The dispenser module 850 further comprises one or more applicators 890 configured for selectively dispensing each lateral load bearing element 812 from the dispenser module 850 and for engaging the dispensed lateral load bearing element 812 with respect to the vertical face VF.

As mentioned above, the elevator system 900 can be adapted for use with a variety of different types of vertical structure VS, for example building structures having an external facia or structure, for example made from one or more of concrete, stone, wood, glass or metal, such an external facia or structure defining the vertical face VF. Accordingly, the form and structure provided for the engaging end 862 of each of the lateral load bearing elements 812 depends on the type of external facia or structure defining the vertical face VF, onto which the lateral load bearing elements 812 are to be engaged via the respective engaging ends 862. Thus, the specific type of lateral load bearing elements 812 for any given implementation of this example can be chosen according to type of external facia or structure defining the vertical face VF. Similarly, the form and structure provided for the applicators 890 can also depend on the type of external facia or structure defining the vertical face VF, onto which the lateral load bearing elements 812 are to be engaged via the respective engaging ends 862.

Figure 19A:
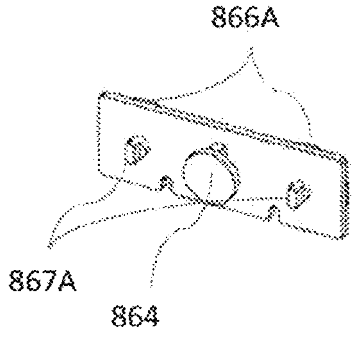
FIG. 19(*a*) is a front perspective view of another example of a lateral load bearing element configured for being dispensed by the dispenser module example of FIG. 14.
Figure 19B:
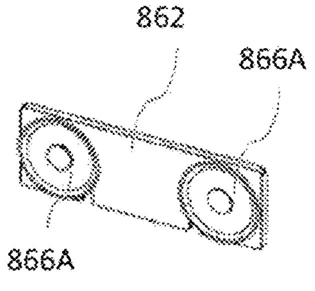
Figure 19C:
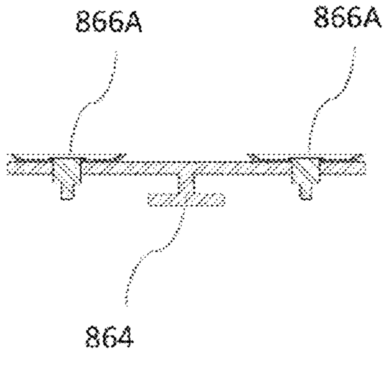
Figure 20A:
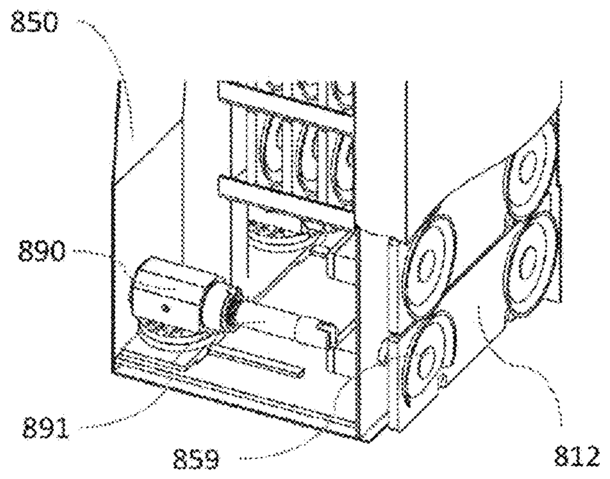
FIG. 20(*a*) is a back perspective partial view of the dispenser module example of FIG. 14 carrying a plurality of lateral load bearing elements of the example of FIG. 19(*a*), in which the respective applicators are aligned with particular lateral load bearing element that is currently residing at the dispensing station.
Figure 20B:
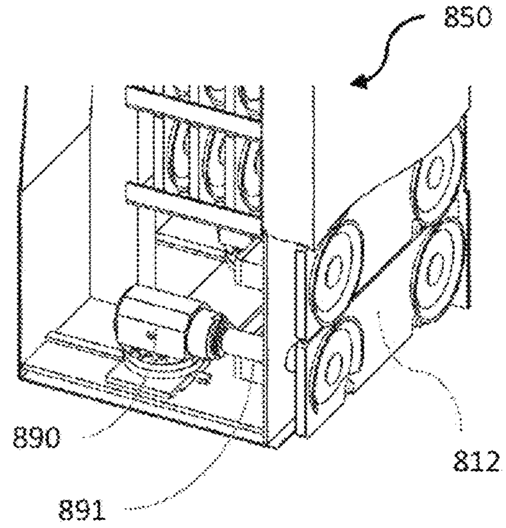
Figure 20C:
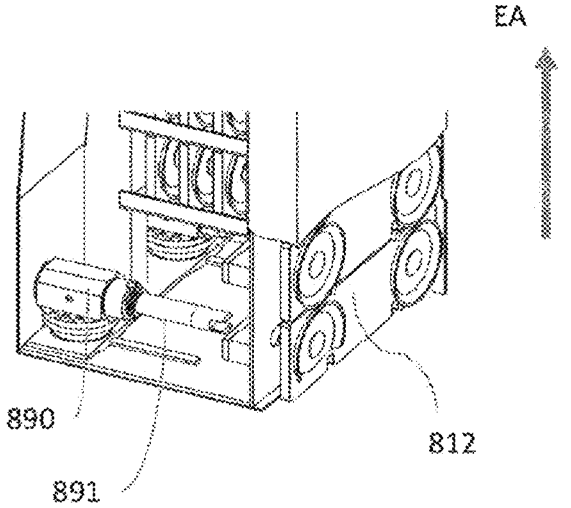
Figure 20D:
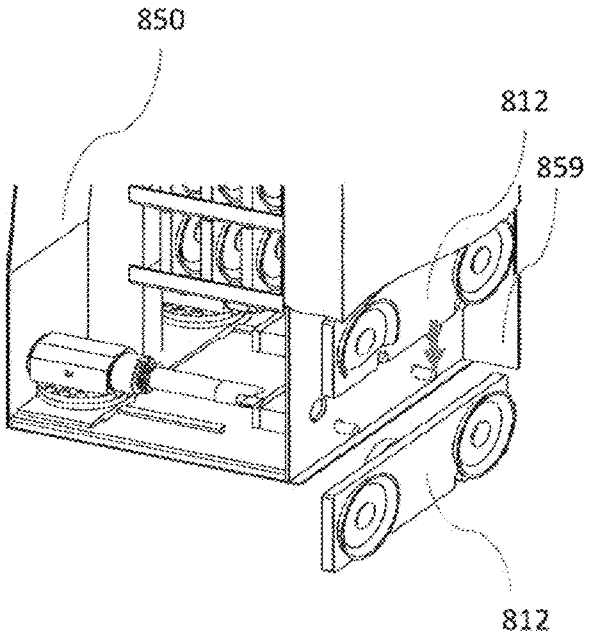
Figure 21A:
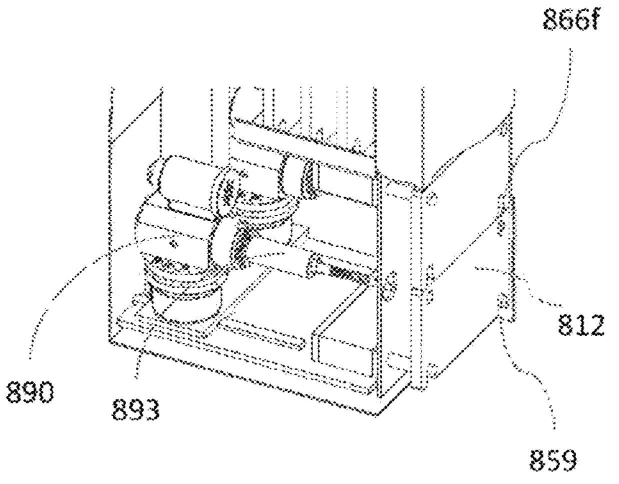
FIG. 21(*a*) is a back perspective partial view of the dispenser module example of FIG. 14 carrying a plurality of lateral load bearing elements of the example of FIG. 18, in which the respective applicators are aligned with the particular lateral load bearing element that is currently residing at the dispensing station.
Figure 21B:
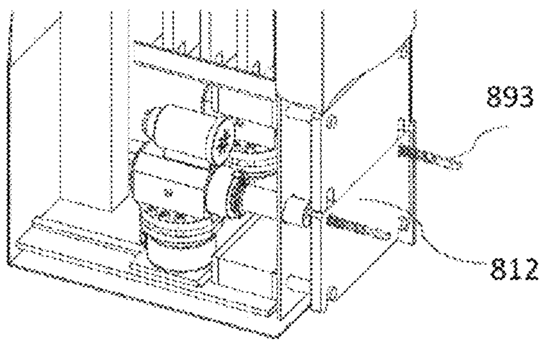
Figure 21C:
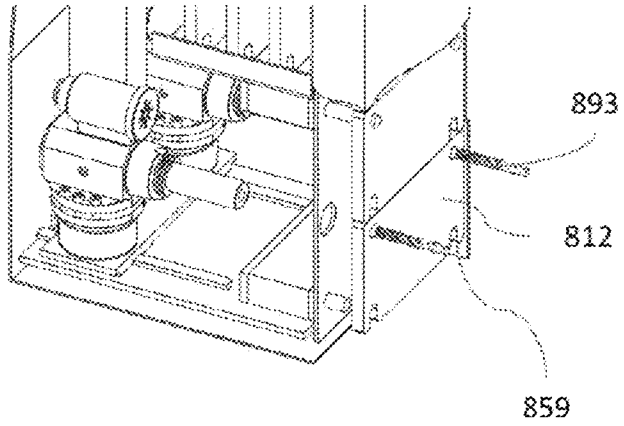
Figure 21D:
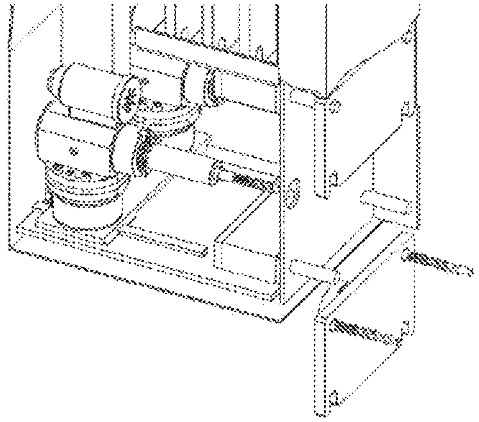
Figure 22E:
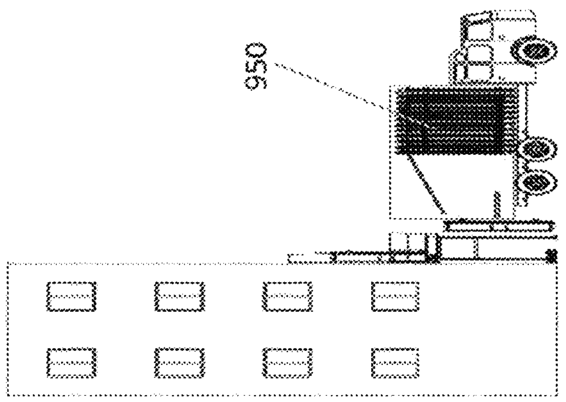
FIG. 22(*a*) schematically illustrates in side view a first step in the assembly of the example of the elevator system example of FIG. 2 from the kit example of FIG. 1, in which the kit is transported to the desired ground zone.
Figure 22D:
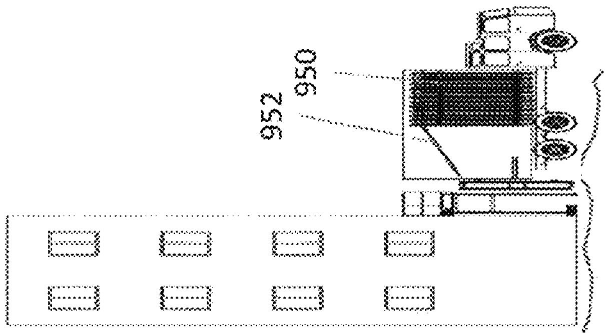
Figure 22C:
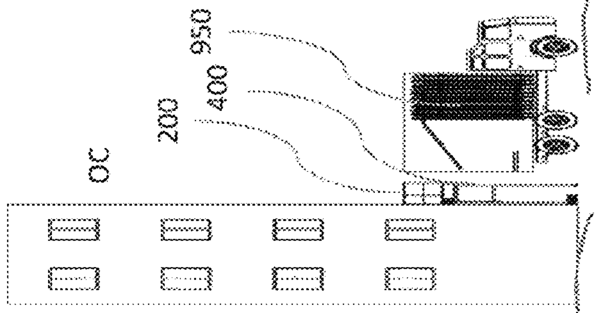
Figure 22B:
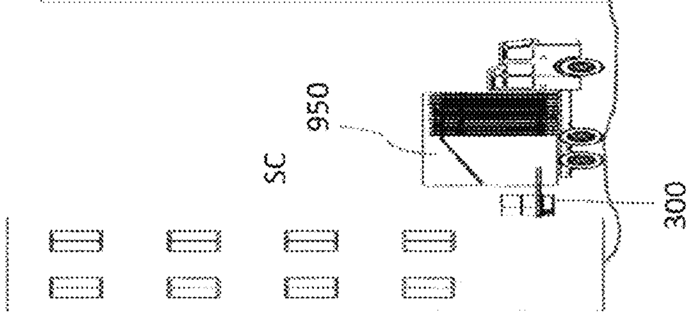
Figure 22A:
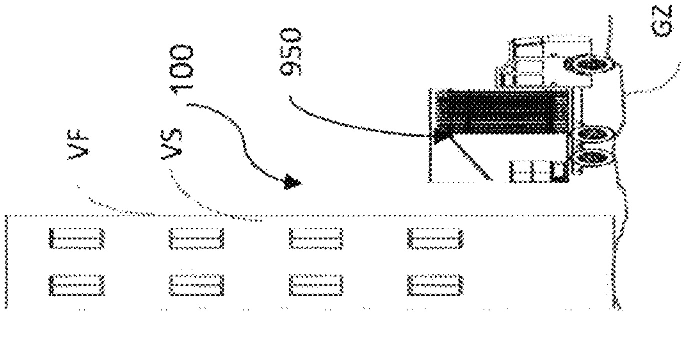
Figure 23A:
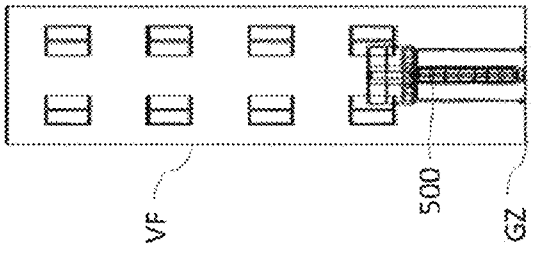
FIG. 23(*a*) schematically illustrates in front view a step in the assembly of the example of the elevator system example of FIG. 2 from the kit example of FIG. 1, in which the support structure is deployed and anchored to the ground zone, and a first rail segment module has been inserted therein.
Figure 23B:
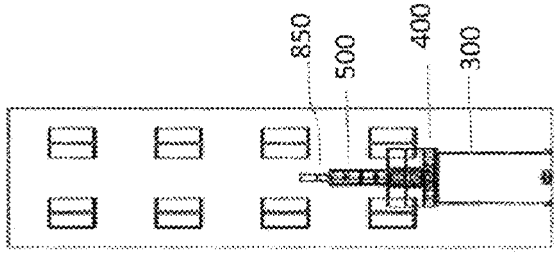
Figure 23C:
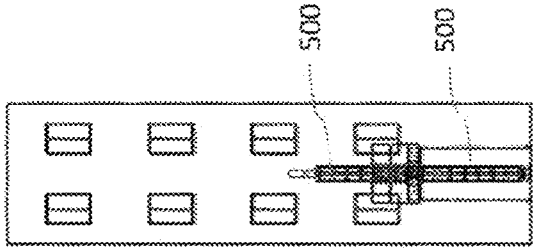
Figure 23D:
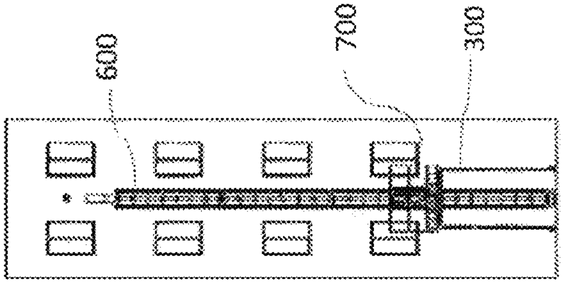
Figure 23E:
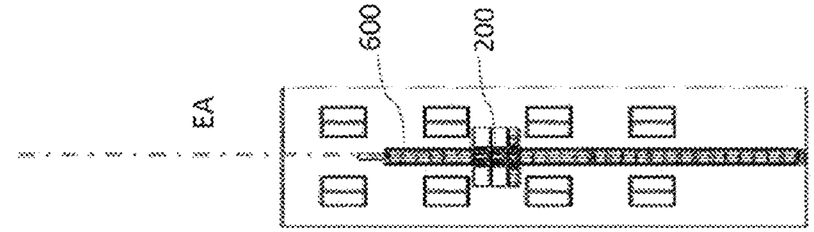

In one such example, the vertical face VF comprises a plurality of generally contiguous glass panels. For example, the respective vertical structure VS can be an office building, apartment block, or the like. Referring to FIGS. 19(*a*), 19(*b*), 19(*c*), the respective engaging ends 862 each correspondingly comprise a plurality of suction cups 866A configured for engagement with the respective glass panels of the vertical face VF. For example, the suction cups 866A can be manipulated from a disengaged configuration to an engaged configuration, such that in the engaged configuration the suction cups 866A are adhered onto the glass surface via pressure difference between the atmosphere acting on an external part of the suction cups 866A and the low pressure cavity on the inside of the suction cups 866A. The low pressure conditions in the inside of the suction cups 866A can be created by pressing the suction cups 866A onto the glass panels, and this can be accomplished for example by pressing plungers 867A, which are affixed to the respective suction cups 866A, towards the respective glass panel. In at least this example, the respective applicators 890 are for example in the form of actuators, for example in the form of pneumatic, hydraulic or electrically actuated jacks, configured for selectively pressing the suction cups 866A onto the glass panels into the respective engaged configurations. For example, and referring to FIG. 20(*a*), the applicators 890 are aligned with the plungers 867A of a particular lateral load bearing element 812 that is currently residing at the dispensing station 859. In operation of the dispenser module 850 to dispense the currently residing lateral load bearing element 812, and referring to FIG. 20(*b*), the applicators 890 operate to extend the respective actuation element (in the form of a jack 891) to engage the respective plungers 867A and thereby first push the respective lateral load bearing element 812 into abutting contact with the respective glass panel of the vertical face VF. Thereafter, the applicators 890 further operate to press the suction cups 866A onto the glass panels to ensure adhesion therebetween. At this point the respective lateral load bearing element 812 has been ejected laterally from the dispensing station 859 and is no longer supported by the mechanical stops 857, and the jacks 891 are retracted (FIG. 20(*c*)). Thereafter the dispenser module 850 can be displaced in an upward direction parallel to the elevator axis EA away from the dispensed lateral load bearing element 812 (together with the mast stack 600), allowing another lateral load bearing element 812 to be received in the dispensing station 859 (FIG. 20(*d*)).

In another such example, the vertical face VF comprises a plurality of concrete structural elements and/or stone structural elements and/or wood structural elements For example, the respective vertical structure VS can be an office building, warehouse, apartment block, or the like. Referring to FIG. 18, the load bearing panel 866F of the respective engaging ends 862 each correspondingly comprises a plurality of openings 866B configured for enabling the load bearing panel 866F to be affixed with the respective concrete/stone/wood panels of the vertical face VF via suitable bolts, nails, screws or the like.

In at least this example, the respective applicators 890 are for example in the form of actuators, for example in the form of electrical screwdrivers or the like, configured for selectively screwing bolts or screws 893 onto the vertical face VF. For example, and referring to FIG. 21(*a*), the applicators 890 are aligned with the openings 866B of a particular lateral load bearing element 812 that is currently residing at the dispensing station 859. In operation of the dispenser module 850 to dispense the currently residing lateral load bearing element 812, and referring to FIG. 21(*b*), the applicators 890 operate to screw and insert the respective bolts or screws 893 and thereby engage the bolts or screws 893 with respect to the vertical face VF. Thereafter, the applicators 890 further operate to press the lateral load bearing element 812 into full load bearing abutment with respect to the vertical face VF. At this point the respective lateral load bearing element 812 has been ejected laterally from the dispensing station 859 and is no longer supported by the mechanical stops 857, and the respective applicators 890 are retracted (FIG. 21(*c*)). Thereafter the dispenser module 850 can be displaced in an upward direction parallel to the elevator axis EA (together with the mast stack 600) away from the dispensed lateral load bearing element 812, allowing another lateral load bearing element 812 to be received in the dispensing station 859 (FIG. 21(*d*)). A suitable automated loading mechanism (not shown) can be provided for automatically loading new screws/bolts 893 onto the respective applicators 890. In alternative variations of this example, the screws/bolts 893 can be replaced with suitable nails, and the respective applicators 890 are in the form of nail guns, configured for nailing the respective dispensed lateral load bearing element 812 to the vertical face VF via nails.

In another such example, the vertical face VF comprises a plurality of ferrous metal structural elements. For example, the respective vertical structure VS can be in the form of a steel braced structure, for example a tower or pylons. In such examples, the respective engaging ends 862 each correspondingly comprises a load bearing panel with a plurality of magnetic elements configured for magnetic engagement with the ferrous metal structural elements. In such cases, the respective applicators 890 are for example in the form of actuators that are configured to push the respective the respective lateral load bearing element 812 into abutment and magnetic engagement with the vertical face VF.

It is to be noted that in each case, including the examples illustrated in FIGS. 20(*a*) to 21(*d*), the respective load bearing end 864 is vertically aligned with the contiguous lateral load bearing rail member 870, and thus as the dispenser module 850 is displaced in an upward direction parallel to the elevator axis EA after dispensing each lateral load bearing element 812, the load bearing end 864 thereof is engaged into the channel 820 of the contiguous lateral load bearing rail member 870, thereby slidingly engaging the mast stack 600 to the vertical face VF.

The kit 100 can be operated to assemble an elevator system 900, for example as follows.

Referring to FIGS. 22(*a*) to 22(*e*), and to FIGS. 23(*a*) to 23(*e*), a carrier vehicle 950, for example a truck, van trailer etc., can be used to transport the kit 100 to the desired location in which it is desired to assemble the elevator system 900. For example, the respective vertical structure VS of interest can be in the form of a multi-storey building or other tall structure, and the ground zone GZ can be for example part of a street or ground next to the vertical structure VS.

Once the carrier vehicle 950 is in position next to the ground zone GZ, the base structure 300 can be taken out of the carrier vehicle 950 while still in the compact configuration SC, and anchored to the ground, as illustrated in FIG. 22(*a*) and FIG. 22(*b*). This step can be carried out manually, or in an automated manner if the carrier vehicle 950 is so configured. In at least this example, the rail segment stacking system 400 and the elevator platform 200 are concurrently coupled with the base structure 300.

Next, and as illustrated in FIG. 22(*c*), the base structure 300 is operated to transit to the operational configuration OC by telescopically extending the support legs 310. At this point the first rail segment module 500 can be delivered, manually or in an automated manner, to the module receiving station 350 from an outside of the base structure 300, for example from a suitable rail segment module source. While in the illustrated example, the rail segment module source is provided by the carrier vehicle 950, in alternative variations of this example, the rail segment module source can be distinct from the carrier vehicle 950, for example another vehicle may be utilized to carry and dispense the rail segment modules 500.

In any case, the rail segment module source can include a delivery rail structure 952 configured for facilitating delivery of each rail segment module 500 in turn to the module receiving station 350.

In at least this example, prior to being inserted into the module receiving station 350, each rail segment module 500 is transitioned from the deployed configuration DC to the undeployed configuration UC via a pivoting operation. In such cases, while stored in the rail segment module source the rail segment modules are in the respective undeployed configuration UC.

Once the first said rail segment module 500 has been inserted into the module receiving station 350 (FIG. 22(*d*) and FIG. 23(*a*)), the module receiving station 350 is operated to feed the first rail segment module 500 into the rail segment stacking system 400 (FIG. 22(*e*) and FIG. 23(*b*)), for example by selectively urging the trolley base 342 in an upward direction through the lift stroke LS, from the module receiving position RP to the feeding position FP. At this point the rail segment stacking system 400 supports and transports the first rail segment module 500 in an upward direction, enabling the trolley base 342 to return in downward direction to the module receiving position RP, ready to receive the next rail segment module 500.

The dispenser module 850 can be coupled to the first rail segment module 500, and when the first rail module has been transported away from the module receiving station 350, the dispenser module 850 can be operated to selectively engage at least one lateral load bearing element 812 with respect to the vertical face VF.

Next, and referring to FIG. 23(*c*), a next rail segment module 500 is inserted into the module receiving station 350, and the module receiving station 350 is operated to feed the received rail segment module 500 into the rail segment stacking system 400, concurrently coupling the just-fed rail segment module 500 to the previously transported rail segment module 500 to thereby sequentially stack in a bottom-to-top direction successive rail segment modules fed from the module receiving station to form the mast stack 600.

The rail segment stacking system 400 is then operated to transport the mast stack 600 including the just-coupled rail segment module 500 away from the module receiving station 350, thereby enabling a further rail segment module 500 to be received by the module receiving station 350. Concurrently, the previously stacked rail segment module 500 is coupled to the lateral load bearing element 812 previously engaged on the vertical face VF, thereby also securing the just-coupled rail segment module 500 to the vertical face VF.

The steps of inserting a new rail segment module 500 into the module receiving station 350, feeding the received rail segment module 500 into the rail segment stacking system 400 and coupling with the previously fed rail segment module 500, and transporting the thus growing mast stack 600 via the rail segment stacking system 400, are repeated for each new rail segment module 500 delivered by the rail segment module source, until the desired height has been reached by the top of the mast stack 600 (FIG. 23(*d*)). Concurrently, the dispenser module 850 is operated to selectively engage at least one lateral load bearing element 812 with respect to the vertical face VF each time the mask stack 600 is advanced in an upward direction responsive to a new rail segment module 500 being provided. At this point, the last-engaged rail segment module 500 can be secured to the ground zone GZ and the base structure 300 can optionally be removed. The mast stack 600 is also secured to the vertical face VF via the lateral load bearing elements 812, and the assembled elevator system 900 is ready for use.

Thus, the elevator system 900 can be assembled from the kit 100, on-site and in a relatively fast manner, and without any need to previously modify the vertical structure VS, enabling the kit to be used with a variety of existing building structures, and with respect to emergency evacuation situations in which time may be of the essence.

Referring to FIG. 23(*e*), the elevator platform 200, previously uncoupled from the base structure 300, can be operated to move along the elevator axis EA via the contiguous vertical elevator rails 620 in an upward or downward direction. Such operation can be via a passenger carried on the elevator platform 200, or via remote control from the ground.

In at least some other examples, the lateral load bearing elements 812 are already secured with respect to the vertical face VF prior to assembly of the elevator system 900 from the kit 100. For example, such lateral load bearing elements 812 are provided on the vertical face VF during or just after construction of the vertical structure VS, or, such lateral load bearing elements 812 were left in place after an elevator system 900 was previously assembled, and subsequently disassembled, at the same site. In such a case, there is no need to couple the dispenser module 850 to any rail segment module 500. Rather, during assembly of the elevator system 900, the mast stack 600 is engaged to the existing lateral load bearing elements 812 on the vertical face VF.

In examples in which the assembled elevator system 900 is to be used for fire extinguishing functions, the first continuous channel and/or the second continuous channel can be connected to a source of pressurized water, for example a fire hydrant, for example via coupling to a respective port 535 (for example corresponding to a rail segment module 500 at a bottom end of the mast stack 600) to allow pressurized water to enter the first continuous channel, the second continuous channel and the delivery pipe elements 530 of the rail segment modules 500 of the mast stack 600. Furthermore, a different one or more of the ports 535 corresponding to one or more selected rail segment modules 500 of the mast stack 600 (for example at the upper end of the mast stack 600) can be opened, to thereby allow pressurized water to be delivered to the vertical structure VS at heights corresponding to the one or more open ports 535. Optionally, a hose pipe can be coupled to a port 535 to thereby enable pressurized water to be delivered via the hose pipe.

Disassembly of the elevator system 900 comprises essentially the same steps as for the assembly operation, but in reverse. The main difference is that during disassembly, the lateral load bearing elements 812 are not typically removed from the vertical face VF, though in at least some examples, the lateral load bearing elements 812 can be removed from the vertical face VF during disassembly, or after disassembly.

In the method claims that follow, alphanumeric characters and Roman numerals used to designate claim steps are provided for convenience only and do not imply any particular order of performing the steps.

Finally, it should be noted that the word "comprising" as used throughout the appended claims is to be interpreted to mean "including but not limited to".

While there has been shown and disclosed examples in accordance with the presently disclosed subject matter, it will be appreciated that many changes may be made therein without departing from the scope of the presently disclosed subject matter as set out in the claims.

The invention claimed is:

1. A kit for providing an elevator system defining an elevator transport axis with respect to an exposed vertical face of a vertical structure, the kit comprising:

an elevator platform;

a plurality of rail segment modules;

a base structure; and a rail segment stacking system, wherein:

the rail segment modules each comprises a respective one or more elevator rail elements, and the rail segment modules are configured for being serially stacked contiguously with respect to one another via the rail segment stacking system to thereby provide a correspondingly progressively elongating mast stack wherein the respective said elevator rail elements are mutually aligned to form at least one contiguous vertical elevator rail parallel to the elevator transport axis, the rail segment modules being further configured for being in selectively secured engagement with respect to the vertical face in operation of the elevator system;

the elevator platform is configured for being selectively transported along the mast stack parallel to the elevator transport axis via the at least one contiguous vertical elevator rail, in operation of the elevator system;

the base structure is configured for being anchored with respect to a ground zone proximal to the vertical face, and having a module receiving station configured for selectively receiving each said rail segment module in turn from a rail segment module source, and for feeding in turn each received said rail segment module to the rail segment stacking system;

the rail segment stacking system is configured for on-site coupling and bottom-to-top stacking of the rail segment modules fed thereto from the module receiving station to thereby provide the progressively elongating mast stack, and for selectively transporting the progressively elongating mast stack vertically and progressively further away from the ground zone after each said rail segment module is coupled and stacked thereto.

2. The kit according to claim 1, wherein the rail segment stacking system is configured:

for transporting a first said rail segment module away from the module receiving station thereby enabling a further said rail segment module to be received by the module receiving station from the rail segment module source;

for enabling successive said rail segment module fed thereto from the module receiving station to be coupled in turn to the currently last-transported said rail segment module to thereby sequentially stack in a bottom-to-top direction successive said rail segment modules fed from the module receiving station to form the progressively elongating mast stack, the mast stack having a progressively increasing vertical dimension correlated to the number of said rail segment modules stacked in the mast stack; and for transporting the mast stack including the just-coupled rail segment module away from the module receiving station thereby enabling a further said rail segment module to be received by the module receiving station.

3. The kit according to claim 1, wherein the rail segment stacking system comprises a frame support configured for enabling each said rail segment module to be fed therethrough from the module receiving station, and a drive system configured for progressively transporting the progressively elongating mast stack through the frame support in operation of the system.

4. The kit according to claim 3, including one of the following:

wherein the drive system comprises a rack and pinion arrangement in cooperation with the rail segment modules, the drive system further comprises a motor drive system operatively coupled to the rack and pinion system, the rack and pinion arrangement comprising a first plurality of rack elements and a second plurality of pinions, wherein the rack elements are provided in the rail segment modules and the pinions are provided in the frame support;

wherein the drive system comprises a rack and pinion arrangement in cooperation with the rail segment modules, the drive system further comprises a motor drive system operatively coupled to the rack and pinion system, the rack and pinion arrangement comprising a first plurality of rack elements and a second plurality of pinions, wherein the rack elements are provided in the rail segment modules and the pinions are provided in the frame support, and, wherein the pinions are rotatably mounted with respect to the frame support and operatively coupled to the motor drive system;

wherein the drive system comprises a rack and pinion arrangement in cooperation with the rail segment modules, the drive system further comprises a motor drive system operatively coupled to the rack and pinion system, the rack and pinion arrangement comprising a first plurality of rack elements and a second plurality of pinions, wherein the rack elements are provided in the rail segment modules and the pinions are provided in the frame support, and, wherein the pinions are rotatably mounted with respect to the frame support and operatively coupled to the motor drive system, and, wherein each said rail segment module comprises at least one said rack element corresponding to each said pinion, the at least one said rack element being provided in respective said elevator rail elements such that when the rail segment modules are coupled and stacked in said mast stack the respective said rack elements corresponding to each said pinion are mutually aligned to provide the corresponding said at least one contiguous rack member, thereby enabling the mast stack to be translated in a linear direction responsive to the pinions being turned by the motor drive system; or wherein the drive system comprises a rack and pinion arrangement in cooperation with the rail segment modules, the rack and pinion arrangement comprising a first plurality of rack elements and a second plurality of pinions, wherein the rack elements are provided in the frame support and the pinions are provided in the rail segment modules.

5. The kit according to claim 1, wherein the rail segment modules each comprises a respective one or more guide rail elements, configured to be mutually aligned to form corresponding one or more contiguous guide rails when the rail segment modules are serially stacked contiguously with respect to one another in the progressively elongating mast stack, and wherein the rail segment stacking system comprises a plurality of alignment rollers configured for cooperating with the one or more contiguous guide rails to maintain the rail segment stacking system aligned with respect to the mast stack.

6. The kit according to claim 1, including one of the following:

wherein the rail segment stacking system is integrated with the elevator platform;

wherein the rail segment stacking system is integrated with the elevator platform, and, wherein each said contiguous vertical elevator rail, is provided by at least one said contiguous rack member; or wherein the rail segment stacking system is integrated with the elevator platform, and, wherein each said contiguous vertical elevator rail, is provided by at least one said contiguous rack member, and, wherein the kit comprises a locking arrangement for selectively locking and unlocking the elevator platform with respect to the base structure, wherein in the respective locked configuration, the rail segment stacking system can be operated for stacking and transporting the rail segment modules to provide the mast stack, and wherein in the respective unlocked configuration, the rail segment stacking system is configured for causing the elevator platform to be selectively transported along the mast stack via the at least one contiguous elevator rail, in operation of the elevator system.

7. The kit according to claim 1, wherein the rail segment stacking system is fixedly mounted to the base structure, and wherein the elevator platform is independent structurally and operationally with respect to the rail segment stacking system.

8. The kit according to claim 1, including one of the following:

wherein the rail segment modules are each configured for being deployed between a stored configuration and a stacking configuration, wherein in the stowed configuration each respective rail segment module has a compact form relative to the stacked configuration, and wherein in the stacked configuration, the respective rail segment module is capable of being stacked with other said rail segment modules to provide the mast stack;

wherein the rail segment modules are each configured for being deployed between a stored configuration and a stacking configuration, wherein in the stowed configuration each respective rail segment module has a compact form relative to the stacked configuration, and wherein in the stacked configuration, the respective rail segment module is capable of being stacked with other said rail segment modules to provide the mast stack, and, wherein in said stowed configuration, each respective said rail segment module is circumscribed by a first envelope enclosing a first volume, and wherein in said stacked configuration, each respective said rail segment module is circumscribed by a second envelope enclosing a second volume, and wherein said second volume is greater than said first volume;

wherein the rail segment modules are each configured having a fixed geometry capable of enabling the rail segment modules to be stacked with respect to one another to provide the mast stack;

wherein each said rail segment module comprises a first coupling arrangement at a first longitudinal end thereof, and a second coupling arrangement at a second longitudinal end thereof, wherein the first coupling arrangement of each said rail segment module is configured for coupling with a said second coupling arrangement of another said rail segment module, and wherein the second coupling arrangement of each said rail segment module is configured for coupling with a said first coupling arrangement of another said rail segment module;

wherein each said rail segment module comprises a plurality of structural members interconnected in load bearing relationship;

wherein each said rail segment module comprises a plurality of structural members interconnected in load bearing relationship, and, wherein each said structural member is in the form of a respective strut extending along an axial length of the respective rail segment module;

wherein each said rail segment module comprises a plurality of structural members interconnected in load bearing relationship, and, wherein each said structural member is in the form of a respective strut extending along an axial length of the respective rail segment module, and, wherein each said rail segment module comprises at least three said structural members, wherein each said structural member is in the form of a respective strut having a strut upper end and a respective lower strut end;

wherein each said rail segment module comprises a plurality of structural members interconnected in load bearing relationship, and, wherein each said structural member is in the form of a respective strut extending along an axial length of the respective rail segment module, and, wherein each said rail segment module comprises at least three said structural members, wherein each said structural member is in the form of a respective strut having a strut upper end and a respective lower strut end, and, wherein each said rail segment module comprises a first coupling member at one rail segment module end, and a second coupling member at another rail segment module end, wherein each said first coupling member is configured for being selectively coupled with a respective said second coupling member of another said rail segment module, and wherein each said second coupling member is configured for being selectively coupled with a respective said first coupling member of another said rail segment module;

wherein each said rail segment module comprises a plurality of structural members interconnected in load bearing relationship, and, wherein each rail segment module comprises a respective first said rack element fixedly mounted to a first said structural member, and a respective said second said rack element fixedly mounted to a second said structural member;

wherein each said rail segment module comprises a plurality of structural members interconnected in load bearing relationship, and, wherein each rail segment module comprises a respective first said rack element fixedly mounted to a first said structural member, and a respective said second said rack element fixedly mounted to a second said structural member, and, wherein for each said rail segment the respective said first said structural member and the respective said second structural member are in fixed transversely spaced relationship;

wherein each said rail segment module comprises a plurality of structural members interconnected in load bearing relationship, and, wherein each rail segment module comprises a respective first said rack element fixedly mounted to a first said structural member, and a respective said second said rack element fixedly mounted to a second said structural member, and, wherein for each said rail segment the respective said first said structural member and the respective said second structural member are in fixed transversely spaced relationship, and, wherein each said rail segment module comprises at least a third said structural member laterally spaced from said first structural member and said second structural member by a segment lateral spacing; or wherein each said rail segment module comprises a plurality of structural members interconnected in load bearing relationship, and, wherein each rail segment module comprises a respective first said rack element fixedly mounted to a first said structural member, and a respective said second said rack element fixedly mounted to a second said structural member, and, wherein for each said rail segment the respective said first said structural member and the respective said second structural member are in fixed transversely spaced relationship, and, wherein each said rail segment module comprises at least a third said structural member laterally spaced from said first structural member and said second structural member by a segment lateral spacing, and, wherein for each said rail segment the respective said first said structural member and the respective said second structural members are movably mounted with respect to the respective said third structural member, and movable between an undeployed configuration and a deployed configuration, wherein in the undeployed configuration each respective rail segment module has a compact form relative to the deployed configuration, and wherein in the deployed configuration, the respective rail segment module is capable of being stacked with other said rail segment modules to provide the mast stack.

9. The kit according to claim 1, wherein the rail segment modules are configured for being in selectively secured engagement with respect to the vertical face via a plurality of lateral load bearing elements previously provided on the vertical face.

10. The kit according to claim 9, wherein said lateral load bearing elements each comprises a load bearing end projecting laterally from the vertical face, and wherein each said rail segment module comprises at least one lateral load bearing rail element configured such that when the rail segment modules are coupled and stacked in said mast stack the respective said at least one lateral load bearing rail elements are mutually aligned to provide the corresponding said at least one contiguous lateral load bearing rail member, the least one contiguous lateral load bearing rail member being configured for enabling sliding engagement with the load bearing ends of the plurality of said lateral load bearing elements in a manner allowing relative translation between the at least one contiguous lateral load bearing rail member and the load bearing ends in a first degree of freedom while preventing free relative movement between the at least one contiguous lateral load bearing rail member and the load bearing ends in a second degree of freedom and in a third degree of freedom orthogonal to the first degree of freedom, wherein the first degree of freedom is parallel to the elevator transport axis.

11. The kit according to claim 1, further comprising a dispenser module configured for selectively engaging a plurality of lateral load bearing elements with respect to the vertical face, concurrent with the mast stack being assembled via the elevator rail assembly structure.

12. The kit according to claim 11, wherein said lateral load bearing elements each comprises a load bearing end configured for projecting laterally from the vertical face when the respective lateral load bearing element is engaged with respect to the vertical face, and an engaging end configured for being selectively engaged with respect to the vertical face when dispensed via the dispenser module.

13. The kit according to claim 12, including one of the following:

wherein the vertical face comprises a plurality of glass panels, and the respective engaging ends each correspondingly comprise a plurality of suction cups configured for engagement with the glass panels;

wherein the vertical face comprises a plurality of ferrous metal structural elements, and the respective engaging ends each correspondingly comprises a plurality of magnetic elements configured for magnetic engagement with the ferrous metal structural elements;

wherein the vertical face comprises a plurality of concrete or stone structural elements, and the respective engaging ends each correspondingly comprises a plurality of nails or screws configured for engagement with the concrete or stone structural elements;

wherein the dispenser module is configured for serially dispensing the lateral load bearing elements into engaging relationship with respect to the vertical face; or wherein the dispenser module is configured for serially dispensing the lateral load bearing elements into engaging relationship with respect to the vertical face, and, the dispenser module comprising at least one dispenser magazine configured for accommodating a plurality of said lateral load bearing elements, and an applicator configured for selectively dispensing each said lateral load bearing element from said at least one magazine and for engaging the dispensed said lateral load bearing element with respect to the vertical face.

14. The kit according to claim 11, including one of the following:

wherein each said rail segment module comprises at least one lateral load bearing rail element configured such that when the rail segment modules are coupled and stacked in said mast stack the respective said at least one lateral load bearing rail elements are mutually aligned to provide the corresponding said at least one contiguous lateral load bearing rail member, the least one contiguous lateral load bearing rail member being configured for enabling sliding engagement with the load bearing ends of the plurality of said lateral load bearing elements in a manner allowing relative translation between the at least one contiguous lateral load bearing rail member and the load bearing ends in a first degree of freedom while preventing free relative movement between the at least one contiguous lateral load bearing rail member and the load bearing ends in a second degree of freedom and in a third degree of freedom orthogonal to the first degree of freedom, wherein the first degree of freedom is parallel to the elevator transport axis;

wherein said dispenser module is configured for being carried by a thereby modified said rail segment module;

wherein said dispenser module is configured for being carried by a thereby modified said rail segment module, and, wherein said dispenser module is mounted atop a first said rail segment module.

15. The kit according to claim 1, further comprising a fire extinguishing system.

16. An elevator system provided by a kit as defined in claim 1, the elevator system being provided by assembling together the elevator platform, the plurality of rail segment modules, the base structure and the rail segment stacking system of the kit.

17. A method for providing an elevator system with respect to an exposed vertical face of a vertical structure, the method comprising:

(a) providing a kit as defined in claim 1;

(b) selectively inserting a first said rail segment module into the module receiving station, and causing the module receiving station to feed the first said rail segment module into the rail segment stacking system;

(c) selectively inserting a next said rail segment module into the module receiving station, and causing the module receiving station to feed the received said rail segment module into the rail segment stacking system, and concurrently coupling the just-fed said rail segment module to the currently last-transported said rail segment module to thereby sequentially stack in a bottom-to-top direction successive said rail segment modules fed from the module receiving station to form the mast stack;

(d) transporting the mast stack including the just-coupled said rail segment module away from the module receiving station thereby enabling a further said rail segment module to be received by the module receiving station;

(e) securing the just-coupled said rail segment module to the vertical face; and (f) repeating steps (c), (d) and (e) until in step (c) a final said rail segment module is inserted into the module receiving station.

18. The method according to claim 17, further comprising one of the following steps:

(g) applying steps (d) and (e) to the final said rail segment module inserted into the module receiving station in step (c);

(h) securing the final said rail segment module to the ground zone;

(h) securing the final said rail segment module to the ground zone, and, (i) removing the base structure from the ground zone;

(j) mounting the elevator platform to the mast stack, and selectively operating the elevator system to cause the elevator platform to be vertically transported along the vertical mast stack via the at least one contiguous vertical elevator rail;

(k) wherein the rail segment stacking system is mounted to the elevator platform to the mast stack, and selectively operating the elevator system to cause the elevator platform to be vertically transported along the vertical mast stack via the at least one contiguous vertical elevator rail.

19. An elevator rail assembly structure configured for on-site stacking of the rail segment modules to provide a progressively elongating mast stack, the elevator rail assembly structure comprising a base structure and a rail segment stacking system, wherein:

the base structure is configured for being anchored with respect to a ground zone proximal to the vertical face, and having a module receiving station configured for selectively receiving each said rail segment module in turn from a rail segment module source, and for feeding in turn each received said rail segment module to the rail segment stacking system;

the rail segment stacking system is configured for on-site coupling and bottom-to-top stacking of the rail segment modules fed thereto from the module receiving station to thereby provide the progressively elongating mast stack, and for selectively transporting the progressively elongating mast stack vertically and progressively further away from the ground zone after each said rail segment module is coupled and stacked thereto.

20. The elevator rail assembly structure according to claim 19, wherein the rail segment stacking system is configured:

for transporting a first said rail segment module away from the module receiving station thereby enabling a further said rail segment module to be received by the module receiving station from the rail segment module source;

for enabling successive said rail segment module fed thereto from the module receiving station to be coupled in turn to the currently last-transported said rail segment module to thereby sequentially stack in a bottom-to-top direction successive said rail segment modules fed from the module receiving station to form the progressively elongating mast stack, the mast stack having a progressively increasing vertical dimension correlated to the number of said rail segment modules stacked in the mast stack; and for transporting the mast stack including the just-coupled rail segment module away from the module receiving station thereby enabling a further said rail segment module to be received by the module receiving station.

* * * * *